(12) United States Patent
Lawson et al.

(10) Patent No.: US 8,611,338 B2
(45) Date of Patent: Dec. 17, 2013

(54) SYSTEM AND METHOD FOR PROCESSING MEDIA REQUESTS DURING A TELEPHONY SESSIONS

(75) Inventors: Jeffrey Lawson, San Francisco, CA (US); John Wolthuis, San Francisco, CA (US); Evan Cooke, San Francisco, CA (US)

(73) Assignee: Twilio, Inc., San Francisco, CA (US)

( * ) Notice: Subject to any disclaimer, the term of this patent is extended or adjusted under 35 U.S.C. 154(b) by 806 days.

(21) Appl. No.: 12/568,646

(22) Filed: Sep. 28, 2009

(65) Prior Publication Data

US 2010/0142516 A1 Jun. 10, 2010

Related U.S. Application Data

(63) Continuation-in-part of application No. 12/417,630, filed on Apr. 2, 2009, now Pat. No. 8,306,021.

(60) Provisional application No. 61/041,829, filed on Apr. 2, 2008, provisional application No. 61/055,417, filed on May 22, 2008, provisional application No. 61/100,578, filed on Sep. 26, 2008, provisional application No. 61/156,746, filed on Mar. 2, 2009, provisional application No. 61/156,751, filed on Mar. 2, 2009, provisional application No. 61/100,627, filed on Sep. 26, 2008, provisional application No. 61/100,630, filed on Sep. 26, 2008.

(51) Int. Cl.
*H04L 12/66* (2006.01)

(52) U.S. Cl.
USPC .......................................................... 370/352

(58) Field of Classification Search
None
See application file for complete search history.

(56) References Cited

U.S. PATENT DOCUMENTS

| | | | |
|---|---|---|---|
| 5,274,700 | A | 12/1993 | Gechter et al. |
| 5,526,416 | A | 6/1996 | Dezonno et al. |
| 5,581,608 | A | 12/1996 | Jreij et al. |
| 5,598,457 | A | 1/1997 | Foladare et al. |
| 6,094,681 | A | 7/2000 | Shaffer et al. |
| 6,138,143 | A | 10/2000 | Gigliotti et al. |
| 6,185,565 | B1 | 2/2001 | Meubus et al. |
| 6,192,123 | B1 | 2/2001 | Grunsted et al. |
| 6,223,287 | B1 | 4/2001 | Douglas et al. |

(Continued)

FOREIGN PATENT DOCUMENTS

| | | |
|---|---|---|
| DE | 1684587 A | 3/1971 |
| EP | 0282126 A | 9/1988 |

(Continued)

OTHER PUBLICATIONS

Complaint for Patent Infringement, *Telinit Technologies, LLC* v. *Twilio Inc.*, dated Oct. 12, 2012.

*Primary Examiner* — Minh-Trang Nguyen
(74) *Attorney, Agent, or Firm* — Jeffrey Schox; Brian Van Osdol

(57) ABSTRACT

In a preferred embodiment, the method of caching media used in a telephony application includes: receiving a media request; sending the media request to a media layer using HTTP; the media layer performing the steps of checking in a cache for the media resource; processing the media request within a media processing server; and storing the processed media in the cache as a telephony compatible resource specified by a persistent address. The system of the preferred embodiment includes a call router and a media layer composed of a cache and media processing server.

14 Claims, 16 Drawing Sheets

(56) References Cited

U.S. PATENT DOCUMENTS

| | | |
|---|---|---|
| 6,269,336 B1 | 7/2001 | Ladd et al. |
| 6,425,012 B1 | 7/2002 | Trovato et al. |
| 6,430,175 B1 | 8/2002 | Echols et al. |
| 6,434,528 B1 | 8/2002 | Sanders |
| 6,445,694 B1 | 9/2002 | Swartz |
| 6,445,776 B1 | 9/2002 | Shank et al. |
| 6,459,913 B2 | 10/2002 | Cloutier |
| 6,493,558 B1 | 12/2002 | Bernhart et al. |
| 6,496,500 B2 | 12/2002 | Nance et al. |
| 6,501,832 B1 | 12/2002 | Saylor et al. |
| 6,507,875 B1 | 1/2003 | Mellen-Garnett et al. |
| 6,600,736 B1 | 7/2003 | Ball et al. |
| 6,606,596 B1 | 8/2003 | Zirngibl et al. |
| 6,625,258 B1 | 9/2003 | Ram et al. |
| 6,625,576 B2 | 9/2003 | Kochanski et al. |
| 6,662,231 B1 | 12/2003 | Drosset et al. |
| 6,704,785 B1 | 3/2004 | Koo et al. |
| 6,707,889 B1 | 3/2004 | Saylor et al. |
| 6,711,249 B2 | 3/2004 | Weissman et al. |
| 6,738,738 B2 | 5/2004 | Henton |
| 6,757,365 B1 | 6/2004 | Bogard |
| 6,765,997 B1 | 7/2004 | Zirngibl et al. |
| 6,768,788 B1 | 7/2004 | Langseth et al. |
| 6,778,653 B1 | 8/2004 | Kallas et al. |
| 6,785,266 B2 | 8/2004 | Swartz |
| 6,788,768 B1 | 9/2004 | Saylor et al. |
| 6,792,086 B1 | 9/2004 | Saylor et al. |
| 6,798,867 B1 | 9/2004 | Zirngibl et al. |
| 6,807,529 B2 | 10/2004 | Johnson et al. |
| 6,807,574 B1 | 10/2004 | Partovi et al. |
| 6,819,667 B1 | 11/2004 | Brusilovsky et al. |
| 6,829,334 B1 | 12/2004 | Zirngibl et al. |
| 6,834,265 B2 | 12/2004 | Balasuriya |
| 6,836,537 B1 | 12/2004 | Zirngibl et al. |
| 6,842,767 B1 | 1/2005 | Partovi et al. |
| 6,850,603 B1 | 2/2005 | Eberle et al. |
| 6,873,952 B1 | 3/2005 | Bailey et al. |
| 6,874,084 B1 | 3/2005 | Dobner et al. |
| 6,885,737 B1 | 4/2005 | Gao et al. |
| 6,888,929 B1 | 5/2005 | Saylor et al. |
| 6,895,084 B1 | 5/2005 | Saylor et al. |
| 6,898,567 B2 | 5/2005 | Balasuriya |
| 6,912,581 B2 | 6/2005 | Johnson et al. |
| 6,922,411 B1 | 7/2005 | Taylor |
| 6,931,405 B2 | 8/2005 | El-Shimi et al. |
| 6,937,699 B1 | 8/2005 | Schuster et al. |
| 6,940,953 B1 | 9/2005 | Eberle et al. |
| 6,941,268 B2 | 9/2005 | Porter et al. |
| 6,947,417 B2 | 9/2005 | Laursen et al. |
| 6,961,330 B1 * | 11/2005 | Cattan et al. ............ 370/352 |
| 6,964,012 B1 | 11/2005 | Zirngibl et al. |
| 6,970,915 B1 | 11/2005 | Partovi et al. |
| 6,977,992 B2 | 12/2005 | Zirngibl et al. |
| 6,985,862 B2 | 1/2006 | Stroem et al. |
| 7,003,464 B2 | 2/2006 | Ferrans et al. |
| 7,006,606 B1 | 2/2006 | Cohen et al. |
| 7,010,586 B1 | 3/2006 | Allavarpu et al. |
| 7,020,685 B1 | 3/2006 | Chen et al. |
| 7,039,165 B1 | 5/2006 | Saylor et al. |
| 7,062,709 B2 | 6/2006 | Cheung |
| 7,076,428 B2 | 7/2006 | Anastasakos et al. |
| 7,089,310 B1 | 8/2006 | Ellerman et al. |
| 7,140,004 B1 | 11/2006 | Kunins et al. |
| 7,143,039 B1 | 11/2006 | Stifelman et al. |
| 7,197,331 B2 | 3/2007 | Anastasakos et al. |
| 7,197,461 B1 | 3/2007 | Eberle et al. |
| 7,197,462 B2 | 3/2007 | Takagi et al. |
| 7,197,544 B2 | 3/2007 | Wang et al. |
| 7,225,232 B2 | 5/2007 | Elberse |
| 7,227,849 B1 | 6/2007 | Rasanen |
| 7,266,181 B1 | 9/2007 | Zirngibl et al. |
| 7,269,557 B1 | 9/2007 | Bailey et al. |
| 7,272,212 B2 | 9/2007 | Eberle et al. |
| 7,272,564 B2 | 9/2007 | Phillips et al. |
| 7,277,851 B1 | 10/2007 | Henton |
| 7,283,515 B2 | 10/2007 | Fowler |
| 7,286,521 B1 | 10/2007 | Jackson et al. |
| 7,287,248 B1 | 10/2007 | Adeeb |
| 7,298,732 B2 | 11/2007 | Cho |
| 7,308,085 B2 | 12/2007 | Weissman |
| 7,308,408 B1 | 12/2007 | Stifelman et al. |
| 7,324,633 B2 | 1/2008 | Gao et al. |
| 7,324,942 B1 | 1/2008 | Mahowald et al. |
| 7,330,890 B1 | 2/2008 | Partovi et al. |
| 7,340,040 B1 | 3/2008 | Saylor et al. |
| 7,369,865 B2 | 5/2008 | Gabriel et al. |
| 7,376,223 B2 | 5/2008 | Taylor et al. |
| 7,376,586 B1 | 5/2008 | Partovi et al. |
| 7,376,740 B1 | 5/2008 | Porter et al. |
| 7,412,525 B2 | 8/2008 | Cafarella et al. |
| 7,428,302 B2 | 9/2008 | Zirngibl et al. |
| 7,440,898 B1 | 10/2008 | Eberle et al. |
| 7,447,299 B1 | 11/2008 | Partovi et al. |
| 7,457,397 B1 | 11/2008 | Saylor et al. |
| 7,486,780 B2 | 2/2009 | Zirngibl et al. |
| 7,496,054 B2 | 2/2009 | Taylor |
| 7,500,249 B2 | 3/2009 | Kampe et al. |
| 7,505,951 B2 | 3/2009 | Thompson et al. |
| 7,519,359 B2 | 4/2009 | Chiarulli et al. |
| 7,522,711 B1 | 4/2009 | Stein et al. |
| 7,536,454 B2 | 5/2009 | Balasuriya |
| 7,552,054 B1 | 6/2009 | Stifelman et al. |
| 7,571,226 B1 | 8/2009 | Partovi et al. |
| 7,613,287 B1 | 11/2009 | Stifelman et al. |
| 7,623,648 B1 | 11/2009 | Oppenheim et al. |
| 7,630,900 B1 | 12/2009 | Strom |
| 7,631,310 B1 | 12/2009 | Henzinger |
| 7,644,000 B1 | 1/2010 | Strom |
| 7,657,433 B1 | 2/2010 | Chang |
| 7,657,434 B2 | 2/2010 | Thompson et al. |
| 7,672,295 B1 | 3/2010 | Andhare et al. |
| 7,675,857 B1 | 3/2010 | Chesson |
| 7,962,644 B1 | 6/2011 | Ezerzer et al. |
| 8,081,958 B2 | 12/2011 | Soederstroem et al. |
| 8,126,128 B1 | 2/2012 | Hicks, III et al. |
| 2002/0006124 A1 * | 1/2002 | Jimenez et al. ............ 370/352 |
| 2002/0077833 A1 | 6/2002 | Arons et al. |
| 2002/0126813 A1 | 9/2002 | Partovi et al. |
| 2003/0026426 A1 | 2/2003 | Wright et al. |
| 2003/0046366 A1 | 3/2003 | Pardikar et al. |
| 2003/0059020 A1 | 3/2003 | Meyerson et al. |
| 2003/0061317 A1 * | 3/2003 | Brown et al. ............ 709/221 |
| 2003/0061404 A1 | 3/2003 | Atwal et al. |
| 2004/0071275 A1 * | 4/2004 | Bowater et al. ............ 379/88.18 |
| 2004/0101122 A1 | 5/2004 | Da Palma et al. |
| 2004/0172482 A1 | 9/2004 | Weissman et al. |
| 2004/0213400 A1 | 10/2004 | Golitsin et al. |
| 2005/0177635 A1 | 8/2005 | Schmidt et al. |
| 2005/0240659 A1 | 10/2005 | Taylor |
| 2005/0246176 A1 | 11/2005 | Creamer et al. |
| 2006/0015467 A1 | 1/2006 | Morken et al. |
| 2006/0143007 A1 | 6/2006 | Koh et al. |
| 2006/0203979 A1 | 9/2006 | Jennings |
| 2006/0209695 A1 | 9/2006 | Archer et al. |
| 2006/0215824 A1 | 9/2006 | Mitby et al. |
| 2006/0217978 A1 | 9/2006 | Mitby et al. |
| 2006/0256816 A1 | 11/2006 | Yarlagadda et al. |
| 2006/0262915 A1 | 11/2006 | Marascio et al. |
| 2006/0285489 A1 | 12/2006 | Francisco et al. |
| 2007/0002744 A1 | 1/2007 | Mewhinney et al. |
| 2007/0036143 A1 | 2/2007 | Alt et al. |
| 2007/0070906 A1 * | 3/2007 | Thakur ............ 370/235 |
| 2007/0070980 A1 | 3/2007 | Phelps et al. |
| 2007/0121651 A1 | 5/2007 | Casey et al. |
| 2007/0127703 A1 | 6/2007 | Siminoff |
| 2007/0133771 A1 | 6/2007 | Stifelman et al. |
| 2007/0192629 A1 * | 8/2007 | Saito ............ 713/193 |
| 2007/0242626 A1 | 10/2007 | Altberg et al. |
| 2007/0265073 A1 | 11/2007 | Novi et al. |
| 2007/0291905 A1 | 12/2007 | Halliday et al. |
| 2008/0134049 A1 | 6/2008 | Gupta et al. |
| 2008/0146268 A1 | 6/2008 | Gandhi et al. |
| 2008/0152101 A1 | 6/2008 | Griggs |
| 2008/0154601 A1 | 6/2008 | Stifelman et al. |

(56) References Cited

U.S. PATENT DOCUMENTS

| | | |
|---|---|---|
| 2008/0165708 A1 | 7/2008 | Moore et al. |
| 2008/0232574 A1 | 9/2008 | Baluja et al. |
| 2008/0313318 A1 | 12/2008 | Vermeulen et al. |
| 2008/0317222 A1 | 12/2008 | Griggs et al. |
| 2009/0052437 A1 | 2/2009 | Taylor |
| 2009/0052641 A1 | 2/2009 | Taylor |
| 2009/0074159 A1 | 3/2009 | Goldfarb et al. |
| 2009/0089699 A1* | 4/2009 | Saha et al. ............ 715/771 |
| 2009/0136011 A1 | 5/2009 | Goel |
| 2009/0171659 A1 | 7/2009 | Pearce et al. |
| 2009/0171669 A1 | 7/2009 | Engelsma et al. |
| 2009/0220057 A1 | 9/2009 | Waters |
| 2009/0222341 A1 | 9/2009 | Belwadi et al. |
| 2009/0225748 A1 | 9/2009 | Taylor |
| 2009/0232289 A1 | 9/2009 | Drucker et al. |
| 2009/0252159 A1 | 10/2009 | Lawson et al. |
| 2010/0037204 A1 | 2/2010 | Lin et al. |
| 2010/0082513 A1 | 4/2010 | Liu |
| 2010/0088698 A1 | 4/2010 | Krishnamurthy |
| 2010/0150139 A1 | 6/2010 | Lawson et al. |
| 2010/0232594 A1 | 9/2010 | Lawson et al. |
| 2010/0235539 A1 | 9/2010 | Carter et al. |
| 2010/0251329 A1 | 9/2010 | Wei |
| 2011/0078278 A1 | 3/2011 | Cui et al. |
| 2011/0081008 A1 | 4/2011 | Lawson et al. |
| 2011/0083179 A1 | 4/2011 | Lawson et al. |
| 2011/0176537 A1 | 7/2011 | Lawson et al. |
| 2011/0280390 A1 | 11/2011 | Lawson et al. |
| 2011/0283259 A1 | 11/2011 | Lawson et al. |
| 2011/0320550 A1 | 12/2011 | Lawson et al. |
| 2012/0036574 A1 | 2/2012 | Heithcock et al. |
| 2012/0281536 A1 | 11/2012 | Gell et al. |

FOREIGN PATENT DOCUMENTS

| | | |
|---|---|---|
| EP | 1464418 A | 10/2004 |
| ES | 2134107 A | 9/1999 |
| WO | 02087804 | 11/2002 |
| WO | 2009124223 A | 10/2009 |
| WO | 2010037064 A | 4/2010 |
| WO | 2010040010 A | 4/2010 |
| WO | 2010101935 A | 9/2010 |
| WO | 2011091085 A | 7/2011 |

* cited by examiner

```
GET /foo.php HTTP/1.1
Host: demo.twilio.com
X-Twilio-CallGuid=DE870AD708ED70AE87D0AE7DAD7
X-Twilio-CallerId=415-555-1212
X-Twilio-NumberCalled=415-867-5309
X-Twilio-AccountId=AAF4AF5AF8A9A885449F7A647AF84
Content-Length: 0
```

FIG. 4A

```
POST /foo.php HTTP/1.1
Host: demo.twilio.com
Content-Type: application/x-www-form-urlencoded
X-Twilio-CallGuid=DE870AD708ED70AE87D0AE7DAD7
X-Twilio-CallerId=415-555-1212
X-Twilio-NumberCalled=415-867-5309
X-Twilio-AccountId=AAF4AF5AF8A9A885449F7A647AF84
Content-Length: 11

Digits=1234
```

FIG. 4B

```
GET /foo.php?digits=1234 HTTP/1.1
Host: demo.twilio.com
X-Twilio-CallGuid=DE870AD708ED70AE87D0AE7DAD7
X-Twilio-CallerId=415-555-1212
X-Twilio-NumberCalled=415-867-5309
X-Twilio-AccountId=AAF4AF5AF8A9A885449F7A647AF84
Content-Length: 0
```

FIG. 4C

```
GET /foo.php  HTTP/1.1
Host: demo.twilio.com
X-Twilio-SMSid=DE870AD708ED70AE87D0AE7DAD7
X-Twilio-SMSSenderID=415-555-1234
X-Twilio-SMSShortCode=11111
X-Twilio-AccountId=AAF4AF5AF8A9A885449F7A647AF84
Content-Length: 0
```

FIG. 4D

```
GET /foo.php  HTTP/1.1
Host: demo.twilio.com
X-Twilio-SMSid=DE870AD708ED70AE87D0AE7DAD7
X-Twilio-SMSSenderId=415-555-1234
X-Twilio-SMSShortCode=11111
X-Twilio-AccountId=AAF4AF5AF8A9A885449F7A647AF84
Content-Length: 21

Message=statusrequest
```

FIG. 4E

```
GET /foo.php?message=statusrequest HTTP/1.1
Host: demo.twilio.com
X-Twilio-SMSid=DE870AD708ED70AE87D0AE7DAD7
X-Twilio-SMSSenderId=415-555-1234
X-Twilio-SMSShortCode=11111
X-Twilio-AccountId=AAF4AF5AF8A9A885449F7A647AF84
Content-Length: 0
```

FIG. 4F

```
                        XML Response

<?xml version="1.0" encoding="UTF-8"?>
<Response>
        <Collect
                successUrl="http://www.example.com/phonetree.php"
                numDigits="1"
                timeout=20
        >
                <Say voice="female">
For sales press one. For support press two. For the operator, press three.
                </Say>
        </Collect>
</Response>
```

FIG. 5A

```
                        XML Response

<?xml version="1.0" encoding="UTF-8"?>
<Response>
        <sms address=415-555-555
                thanks for the your text, will call at 5 PM.
        </sms>
        <CallAtTime="17:00PST">
                Today
                <Dial>415-555-5309</Dial>

</CallAtTime>
</Response>
```

FIG. 5B

```
POST /2008-08-01/Accounts/AC309475e5fede1b49e100272a8640f438/Calls  HTTP/1.1
     Caller=4155555309&Called=4155551212&Url=http://www.myapp.com/myhandler.php <TwilioResponse>
     <Call>
          <Sid>CA42ed11f93dc08b952027ffbc406d0868</Sid>
          <CallSegmentSid/>
          <AccountSid>AC309475e5fede1b49e100272a8640f438</AccountSid>
          <Called>4155551212</Called>
          <Caller>4155555309</Caller>
          <PhoneNumberSid>PN01234567890123456789000<PhoneNumberSid>
          <Status>0</Status>
          <StartTime>Thu, 03 Apr 2008 04:36:33  -0400</StartTime>
          <EndTime/>
          <Price/>
          <Flags>1</Flags>
     </Call>
</TwilioResponse>
```

FIG. 6

SYSTEM AND METHOD FOR PROCESSING MEDIA REQUESTS DURING A TELEPHONY SESSIONS

CROSS-REFERENCE TO RELATED APPLICATIONS

This application is a continuation in part of prior application Ser. No. 12/417,630 filed 2 Apr. 2009 and entitled "System and Method for Processing Telephony Sessions", which claims the benefit of the following: U.S. Provisional Application No. 61/041,829 filed 2 Apr. 2008 and entitled "System and Method for Processing Telephony Sessions"; U.S. Provisional Application No. 61/055,417 filed on 22 May 2008 and entitled "System and Method for Processing SMS Messages", U.S. Provisional Application No. 61/100,578 filed on 26 Sep. 2008 and entitled "System and Method for Processing Telephony Sessions", U.S. Provisional Application No. 61/156,746 filed on 2 Mar. 2009 and entitled "System and Method for Processing Telephone Sessions", and U.S. Provisional Application No. 61/156,751 filed on 2 Mar. 2009 and entitled "System and Method for Processing Telephony Sessions".

This application also claims the benefit of the following: U.S. Provisional Application No. 61/100,627 filed on 26 Sep. 2008 and entitled "System and Method of Caching Media for Telephony Sessions" and U.S. Provisional Application No. 61/100,630 filed on 26 Sep. 2008 and entitled "System and Method of Caching Media for Telephony Sessions."

All of priority documents identified in this section are incorporated in their entirety by this reference.

TECHNICAL FIELD

This invention relates generally to the telephony field, and more specifically to a new and useful system and method for processing media requests during telephony sessions in the telephony field.

BACKGROUND

In the last decade, legislation and the advent of Voice over Internet Protocol (VOIP) have revolutionized the communication industry with new technologies, business models, and service providers. Software and commodity hardware now provide an alternative to expensive carrier equipment. One can implement extensible call switching and voice application logic in Open source software applications, such as Asterisk and FreeSwitch. These new application stacks, however, usher in new complexities and challenges, requiring new skill sets to deploy, develop, and maintain. Deploying telephony services requires knowledge of voice networking and codecs, hardware or services to bridge servers to the public phone infrastructure, capital investment in hardware, and ongoing collocation of that hardware. These burdens are a mere prerequisite to developing the actual application, which requires developers to train in new languages, tools, and development environments. Even telephony applications that currently try to leverage a model more similar to web-development such as Voice Extensible Markup Language (VoiceXML), require the dedication to learn a new language and understand telephony interaction. Ongoing operation and maintenance of these services requires teams to adopt new analysis tools, performance metrics, and debugging methodologies. Developing even the simplest of voice services (such as a so-called "phone tree") requires significant upfront and ongoing investment in specialized infrastructure, skills, and operations.

In similar manner to how multimedia has impacted the advance of the Internet, interacting with media through telephony services is also becoming more important for telephony applications. However, media consumption through an internet browser and a telephony device are completely different experiences, each having different user expectations. Unlike websites, where users have been conditioned for loading times and processing time, phone users expect real-time results and often view processing delays as application annoyances. Internet media is inherently multimedia: a combination of text, images, video, audio, and other forms of multimedia. Telephony devices are limited in the format of media consumable by a user. In the case of a typical phone, audio with 8-bit PCM mono with 8 kHz bandwidth format is the native form. Tremendous amounts of processing must be performed by telephony applications to convert from internet media to telephony compatible media. The processing increases infrastructure costs, slows down the responsiveness of a telephony application, and overall, limits the possibilities of telephony applications. The inefficiency of media processing impacts not only one telephony application but all applications operating on a system. Thus, there is a need in the telephony field to create a new and useful system and method for processing media requests during telephony sessions. This invention provides such a new and useful system and method.

SUMMARY

The method of the preferred embodiment for processing telephony sessions include the steps of communicating with an application server using an application layer protocol, processing telephony instructions with a call router, and creating call router resources accessible through an Application Programming Interface (API). The method and system of the preferred embodiments enables web developers to use their existing skills and tools with the esoteric world of telephony, making telephony application development as easy as web programming. The method and system use the familiar web site visitor model to interact with a web developer's application, with each step of the phone call analogous to a traditional page view. Within this model, developers reuse their existing tools and techniques, including familiar concepts such as HTTP redirects, accessing resources through an API, cookies, and mime-type responses to construct complex telephony applications. The method of processing telephony instructions and creating call router resources accessible through an API (a call router API) cooperatively function to enable a stateless and simple telephony language with more call router resources and information provided through the call router (preferably a REST API as is familiar to many web developers). In one embodiment, the telephony instructions set may have fewer than dozen verbs, simplifying the language so that developers can quickly learn and implement telephony applications, while the call router API compliments the simple telephony instructions to enable complex telephony applications.

Within this framework for processing a telephony session, a method and system is described for caching media of the telephony session. The method and system include a cache and a media layer that cooperatively works to minimize processing and create telephony compatible media files that are cacheable. This method and system further enhances the developer process by removing the complexities of telephone media formatting and creates an improved telephony application system.

BRIEF DESCRIPTION OF THE FIGURES

FIGS. 4A-4C are examples of a HTTP GET request, a HTTP POST request, and a HTTP GET request, respectively.

FIGS. 4D-4F are examples of a HTTP requests.

FIGS. 5A and 5B are examples of XML responses.

FIG. 6 is an example of a call Router request and response.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Method for Processing Telephony Sessions

As shown in FIGS. 1, 2A, 2B, 3A, and 3B, the method 10 of the preferred embodiment for processing telephony sessions include the steps of communicating with an application server using an application layer protocol S110, processing telephony instructions with a call router S120, and creating call router resources accessible through an Application Programming Interface (API) S130. The preferred method may also include other steps and/or sub-steps, as explained below.

1A. Communicating with an Application Server

Figure 1:
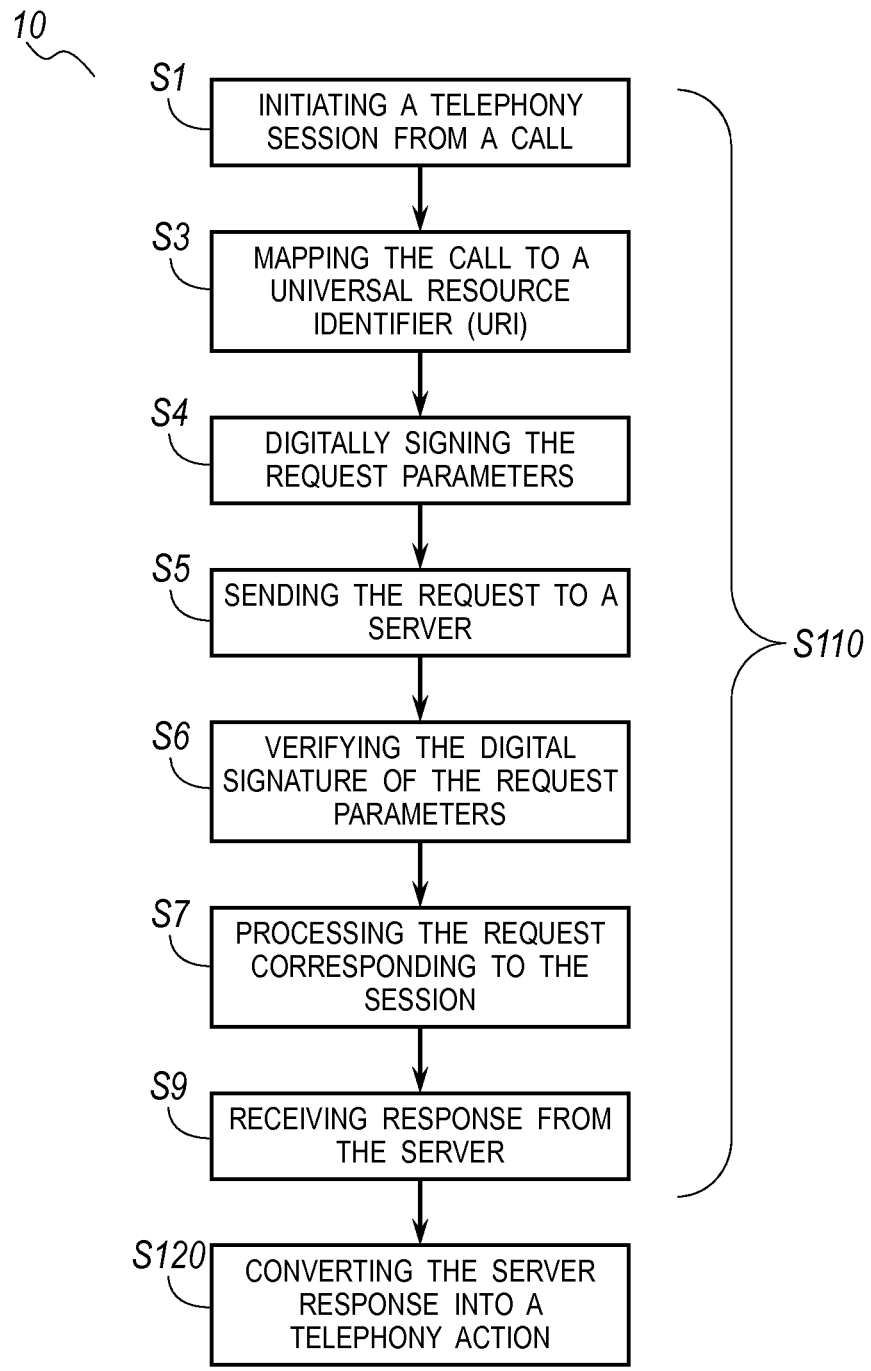
FIG. 1 is a flowchart representation of a preferred method of the invention.

As shown in FIG. 1, the step of communicating with an application server using an application layer protocol S110 preferably includes the following sub-steps: initiating a telephony session S1, mapping a call to a Universal Resource Identifier (URI) S3, sending a request to a server associated with the URI S5, processing the request corresponding to the state of a telephony session S7, and receiving a response from the server S9. One of the challenges of using the familiar web site visitor model is that a third party web application may expose URIs that contain sensitive data or that suggest actions that could maliciously manipulate the application database. In the preferred embodiment, the call router cryptographically signs outbound requests to customer web applications using an account-specific key. More specifically, the step of communicating with the application server includes the additional steps of digitally signing the request parameters S4 and verifying the digital signature of the request parameters S6. Only the call router and the application server know that key, so any request that includes parameters (URL, POST data, headers, etc) signed with that key can be checked for authenticity before allowing such operations. This method also provides verification of authenticity over insecure links (HTTP) with low CPU overhead.

Step S1, which recites initiating a telephony session, functions to accept an incoming message. The message is preferably a call from a PSTN-connected (Public Switched Telephone Network) or Internet addressable devices, such as landline phones, cellular phones, satellite phones, Voice-Over-Internet-Protocol (VOIP) phones, SIP devices, Skype, Gtalk, or any other suitable PSTN-connected or Internet addressable voice device. The message may alternatively be a Short Message Service (SMS) message.

A SMS gateway server may alternatively connect to a SMS network through a Short Message Service Center ("SMS-C"), directly to the Signaling System #7 (SS7) telephony network, or by any other suitable SMS gateway provider, and the message is preferably received from the gateway by the call router and translated into a format (such as a URI) that can be sent over the public Internet such as HTTP, based on the recipient address of the SMS, such as a short code, or Direct Inward Dialing (DID), or other suitable unique recipient identifier. The message may alternatively be a multimedia message, a facsimile transmission, an email, or any other suitable messaging medium. The originating phone number of the PSTN device is preferably captured using caller ID, but any other suitable ID may be captured, such as a VOIP provider ID, SMS device number, email address, or a short code. The dialed phone number, the EIN, and/or billing identifier, and/or the date and time of the call are also preferably included in the session information. An authentication ID may additionally or alternatively be included in the session information.

In one variation, Step S1 also functions to initiate a telephony session (such as a phone call) via an HTTP or other request sent to a call router from an application running on a third-party server. In this variation, the application running on the server preferably specifies an initial URI for the call router to use for telephony session in step S3, as well as the phone number (or other addressable destination) to dial and the source phone number (caller id). In this variation, the call router API is preferably used by the application server to request an outgoing call from the call router.

Step S3, which recites mapping the call to a Universal Resource Identifier (URI), functions to enable a telephony session to be converted into a format that may be handled with standard web servers and web applications. The mapping is preferably performed using a call router. The initial URI is preferably pre-specified at the call router by a web application (which may be running on a third party server) or call router account owner. More preferably, the initial URI is assigned to the call via a unique identifier for the call destination, such as a DID (Direct Inbound Dial) phone number, or a VOIP SIP address. The URI may alternatively be specified by a remote server or other suitable device or method. In one variation, the URI may be used to encapsulate state information or a portion of state information from the initiated telephony session, such as the originating phone number, the dialed phone number, the date and time of the call, geographic location of the caller (e.g. country, city, state, and/or zip), and/or the unique call ID. The information included in the URI may be included in the form of a URI template. For example the URI default template could be: http://demo.twilio.com/myapp/{dialed phone number}/{originating phone number} or http://demo.twilio.com/myapp/foo.php?dialed_number={dialed phone number}& originating_number={originating phone number}.

Figure 10:
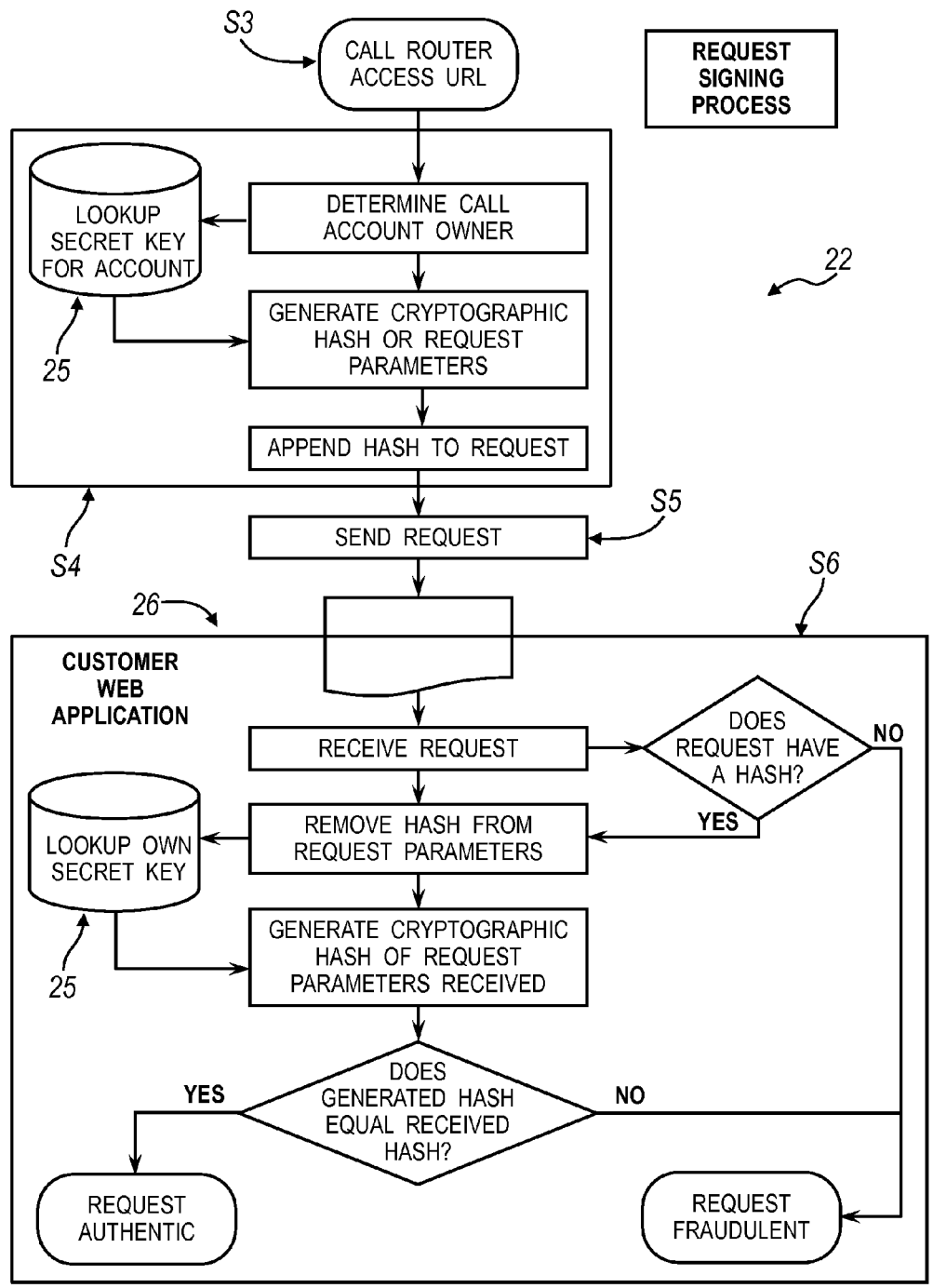
FIG. 10 is a flowchart representation of the sub-steps relating to the digital signature aspect of the preferred method of the invention.

Step S4 functions to digitally sign the request parameters. As shown in FIG. 10, Step S4 preferably determines the call router account owner and, more preferably, looks up the account owner's unique ID or secret key and signs a set of request parameters. Step S4 is preferably accomplished by generating a cryptographic hash of the request parameters, preferably including the URI as well as any request body parameters (in the case of an HTTP POST, for example) with the unique key associated with the call router account owner. The cryptographic hash is preferably generated by appending the hash of the request parameters to the original set of request parameters. The hash is preferably appended to a URL, but if the hash is particularly long (i.e. for a very large number of parameters) the hash may be included in an HTTP header, where there is no limitation on size. In a variation of Step S4, at least one sensitive parameter may be individually encrypted using the account owner's secret key before the hash is processed. In another variation, a cryptographic credential delegation system, such as Oauth (oauth.net), may alternatively be used to electronically sign the request.

Step S5 functions to send the request to a server. Preferably, the request is sent to a URI and, more preferably, the request is sent to the URI mapped in S3. The request preferably includes a cryptographic hash computed from the set of request parameters (acting as a digital signature), but the request may alternatively include individually encrypted request parameters if the parameters are determined to contain sensitive data. The server is preferably a third party server and, more preferably, the server is running a web application. The request is preferably sent to a server over a network. In one variation, the request is sent to a local server on a local area network. In another variation, the request is sent to a server running locally on the device originating the call. In yet another variation, the request may be sent to multiple servers. The request preferably encapsulates at least a portion of the state information from the initiated telephony session, such as the originating phone number, the dialed phone number, the date and time of the call, geographic location of the caller (e.g. country, city, and/or state, zip), and/or the unique call ID. The request, more preferably, encapsulates all the state information of the call, but may alternatively include no state information or partial state information. The state information from the initiated telephony session is preferably sent via HTTP POST in the request body, HTTP GET in the request URI, HTTP header parameters to mimic the data flow of a web browser, or by any combination or suitable alternative way. If new state information is generated in the course of the operation of the call router, a request to the application server is preferably made to communicate the new state and to request new telephony instructions. Preferably, new state information is not kept or acted upon internally by the call router, but is passed to the application server for processing. Alternatively, partial state information is preferably stored on the call router until a fully updated state is achieved, and then communicated to the application server. For example, the application server may specify that multiple digits should be pressed on the keypad, not just one, before new call state is derived and communicated to the application server. In one variation, the information from the initiated telephone session may be a web-form submission included in the HTTP POST request. The request may include any state information from the telephony session, such as the originating phone number, the dialed phone number, the date and time of the call, and/or the unique call ID, the current status of the phone call (pending, in-progress, completed, etc.), or the results of a telephony action, including Dual Tone Multi Frequency (DTMF) digit processing, or a representation of or a link to a sound recording, or the status of the last command, or other call state. Examples of a HTTP GET request, a HTTP POST request, and a HTTP GET request are shown in FIGS. 4A, 4B, and 4C, respectively. Further examples of HTTP communication used for SMS messaging are shown in FIGS. 4D, 4E, and 4F. The HTTP request (or any suitable request communication) to the server preferably observes the principles of a RESTful design. RESTful is understood in this document to describe a Representational State Transfer architecture as is known in the art. The RESTful HTTP requests are preferably stateless, thus each message communicated from the call router to the application server preferably contains all necessary information for operation of the application server and response generation of the application server. The call router and/or the application server preferably do not need to remember or store previous communications to be aware of the state. Documents, media, and application state are preferably viewed as addressable resources, combined with data provide to the resource via request parameter, such as HTTP GET or HTTP POST parameters, or request body contents. Such request data may include an updated representation of the call resource, or other call state data generated as a result of call router operation, such as digits pressed on the keypad or audio recordings generated. State information included with each request may include a unique call identifier, call status data such as whether the call is in-progress or completed, the caller ID of the caller, the phone number called, geographic data about the callers, and/or any suitable data. However, a varying level of a RESTful communication (statelessness) may be used, such as by using cookies, session tracking, or any suitable devices to simulate a normal website visitor model. Preferably, data sent with each request may fully enable the application server to determine the next state of the call to execute. RESTfulness preferably does not preclude using external datasource, such as a database, to lookup additional data to log call meta data, or determine application logic.

Figure 7:
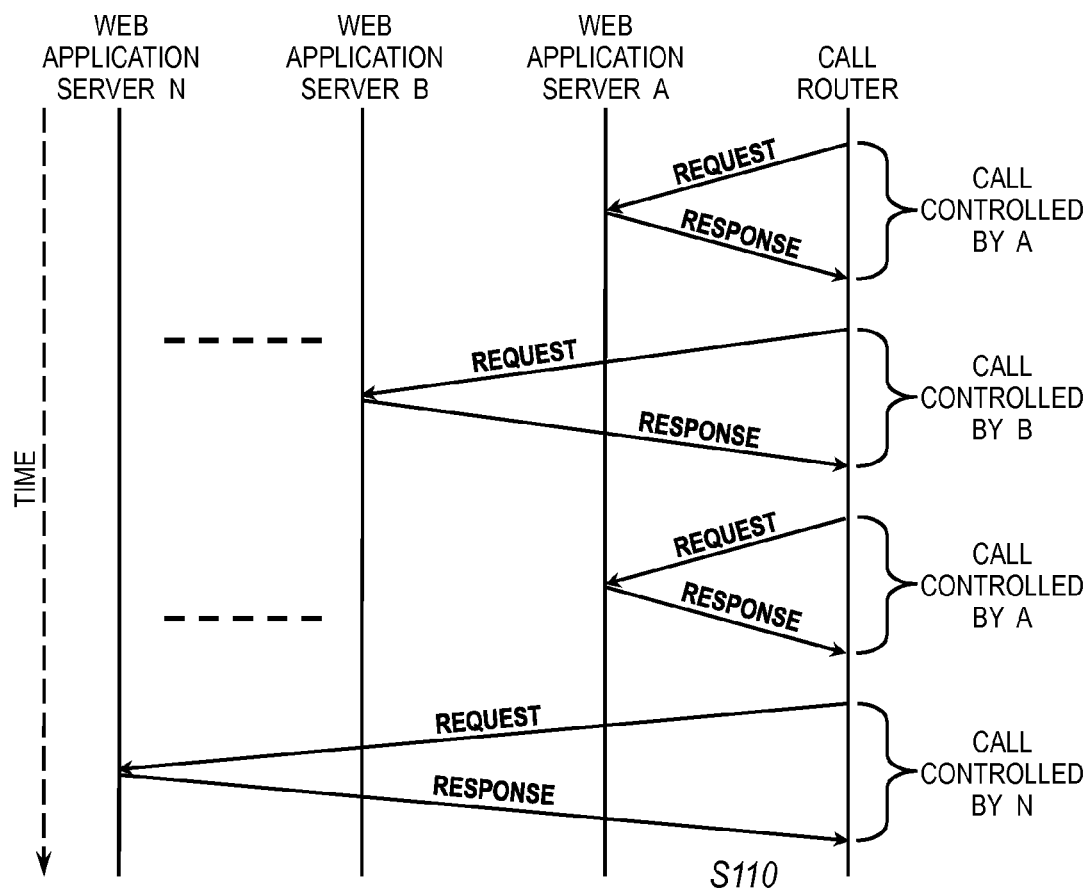
FIGS. 7-9 are schematic representations of various applications that incorporate the principals of the preferred method of the invention.

Step S6 functions to verify the digital signature of the request parameters. As shown in FIG. 7, after the request is received at the server, the request parameters are preferably checked and/or parsed for a hash. The cryptographic hash is preferably included in the URL of an HTTP request, but may alternatively be included in the HTTP header of the request. If the request does not include a hash, and the web application server has enabled the hash function checking as a security measure, the request is preferably determined to be fraudulent, which would include—for example—malicious requests, mis-routed requests, corrupted requests and any other requests not intended for the application server. If the set of request parameters includes a hash, the hash is preferably extracted from the request, and the secret key of the customer web application (i.e. the same key that is stored on the call router as the customer account secret key) is preferably used to generate a server side cryptographic hash of the parameters received. The server side cryptographic hash is preferably compared to the hash included with the request and if the hashes do not match, the request is preferably determined to be fraudulent. However, if the server side cryptographic hash matches the request hash, the request is preferably determined to be authentic and ready for further processing at the application server. In the variation mentioned above in Step S4, where sensitive parameters may have been encrypted using the secret key, Step S6 preferably includes decrypting the sensitive parameters. The application server and the third parties operating the application are preferably responsible for completing this verification step, but the verification may alternatively be completed by a single party, such as when a single party operates the application server and the call router.

The application server may alternatively be configured to ignore a hash included with the request parameters if request authentication is not important to the application.

Step S7, which recites processing the request corresponding to the state of a telephony session, functions to perform processing functions on at least a portion of the data included in the request. The processing functions are preferably performed on a third party server. The processing functions may include recording the data included in the request and/or metadata about the call session, routing to another URI, performing a database lookup of at least one portion of the data included in the request, voice recognition processing, or any other suitable processing function. The processing functions may re-use logic and data from other business applications, such as customer databases and/or shopping cart applications, which may be linked using caller-id or caller provided information. State information is preferably communicated with each request from the call router, and application state is preferably not required on the application server. Alternatively, the application server may store state between each request related to the call, by using HTTP cookies, sessions, and/or database records. In some cases, such as the case of a static HTML page running on a server or a stored media file such as an mp3 or way file stored on a server, Step S7 may be simplified, and a file mapped to disk by the URI may be simply returned. In some situations, media files (such as an mp3 or way audio file), are requested by the call router and returned by the application server.

Step S9 recites receiving a response from the server. This response is preferably an HTTP response. The response is preferably sent as XML, audio binary, or raw text, but may alternatively be any sort of messaging format, including HTML, delimited text, key/value text or binary encoded format. The HTTP response preferably includes directions to perform telephony actions. The response may alternatively or additionally include a new URI or a new URI template to use with the telephony action in Step S3. An additional example XML response is shown in FIGS. 5A and 5B. Additionally, the response preferably passes through a media layer. The media layer preferably performs any necessary caching and/or processing on returned media files and/or instructions to create a telephony compatible media file. The operation of the media layer is preferably transparent to the call router such that the media layer provides properly formatted media to the call router preferably without the call router being aware of the media conversion. The method of caching media during a telephony session is further described below.

1B. Processing Telephone Instructions

The step of processing telephone instructions with a call router S120 preferably functions to convert the server response into telephony actions or executable operations during a telephony session. The telephony actions may include, for example, playing a pre-recorded sound file at a server-specified URI (such as a static mp3 file located at http://demo.twilio.com/myapp/1234.mp3), reading text to the caller using text-to-speech technology, calling another number (such as creating a new voice connection through the PSTN, SIP/VoIP, or other IP technology system), collecting digits via DTMF input, recording voice response audio, TTY or other inputs, sending an SMS message, or any suitable combination or sequence of these or other suitable actions. This conversion of the server response is preferably performed at a call router. Preferably, Step S120 includes processing the response mime-types associated with the server response. For example, if the response mime-type is XML, it is considered to be a set of call router instructions. If the response mime-type is MP3, it is considered a sound file to be played for the caller. If the response type is plain text, it is considered to be text to be read, via Text-To-Speech, to the caller. Response mime-types associated with media handling are preferably passed through the media layer, and may be modified, processed, or created within the media layer. In the case where call router instruction includes playing a media file from an external server, the call router preferably sends the appropriate HTTP or HTTPS request to the external server. This request is preferably passed through the media layer. The media layer either completes the request by fetching the media file and performing any necessary media processing or the media file may alternatively be cached, in which case the media layer returns the a pre-processed, cached version of the media file. Response mime-types that involve the generation of media such as Text-To-Speech instructions, are additionally handled by the media layer. The media layer preferably handles the querying a cache, generating the necessary media, and/or caching the media.

Figure 8:
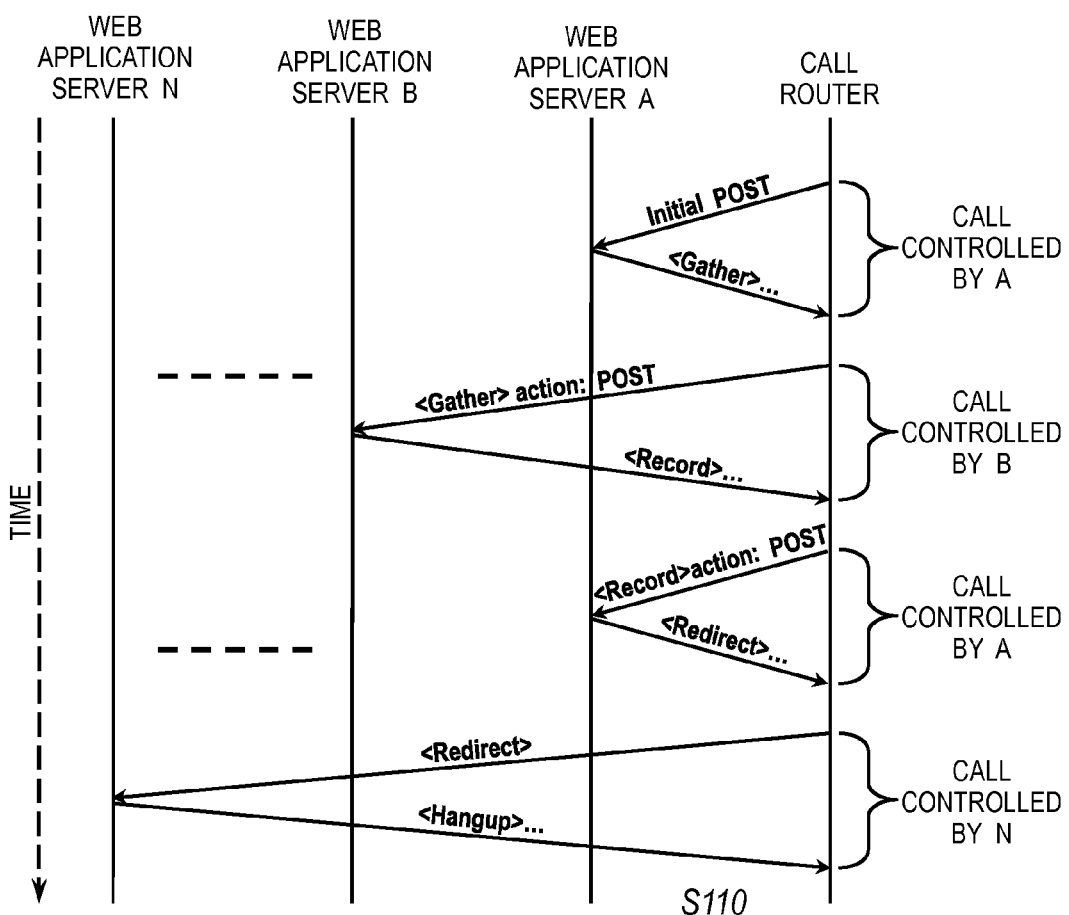

Contents of the server response, such as an XML document, are preferably converted into a telephony action by processing the document sequentially (e.g. line by line). Telephony instructions are preferably contained within the document in the form of a markup language, such as XML as shown in FIGS. 5A and 5B. This sequential approach to processing a document of telephony instructions is enabled when the communication is stateless and all the necessary information is contained within the URI. This stateless communication preferably allows telephony instructions (verbs or commands) to be used as the programming interface for a server application performing telephony services. Algorithmic interpretation (based on the state of the communication) of the telephony verbs or the document is preferably not necessary. The telephony actions are preferably executed in the order of telephony instructions found in the contents of the server response. For example, an XML document may include the necessary verbs to carry out the telephony actions of reading text to a caller, monitoring keys pressed by the caller, and redirecting the caller to a new URI using the pressed keys as part of the data within the new URI. Preferably, the telephony action (such as digits pressed) results in new state information, which may result in a repetition of some steps of the method, preferably beginning at Steps S3. The next URI is preferably provided by the server as part of the processing instructions. In another variation, the last URI is reused if the server fails to specify a next URI. In yet another variation, no repetition occurs if the server fails to specify a next URI, and processing continues below at the next call router instruction. The behavior may be determined by the nature of the call router instruction; for example, instructions that generate no new state information would not need to have a next URI since they don't trigger communication with a remote server. More preferably, the telephony actions result in the repetition of step S3 with the new URI resulting from Step S11, but may alternatively initiate a repetition of one or more steps (Steps S5, S7, S9, or S11) of the method. Step S3 is preferably repeated using all new phone session state information resulting from execution of a telephony action, such as digits pressed, a recorded audio file, or the success or failure of any telephony action requested. Repetition also includes all state information that remains relevant during the course of the session, such as Caller, Called, unique Call ID, and call status. The state information may also be represented in the form of a URI Template. For example, if the server response specifies that the call router should collect DTMF digits, and specifies that the next URL is the URI Template http://demo.twilio.com/foo.php?digits={Digits}, and the caller presses 1234, the resulting URI is http://demo.twilio.com/foo.php?digits=1234. Similarly, if the server response specifies the URI Template: http://demo.twilio.com/myapp/{Digits}.mp3, the resulting HTTP Request could be to a static mp3 file located at: http://demo.twilio.com/myapp/1234.mp3. Thus, a call may be controlled by one server that issued the telephony instruction and a second server that processes the response, as shown in FIGS. 7 and 8. Such call control hand-offs constitute the transfer of state information between servers in the form of a URI and accompanying request data, such as GET, POST, and/or request body. Preferably, all state communications conform to a syntax established by the call router to facilitate integration between multiple servers. For example, digits pressed on the keypad are preferably communicated to application servers in an identical fashion, thus minimizing the need for coordination between a multiple application servers with regard to how state is transferred. Alternatively, call router instructions may dictate the method of communicating new state information, such as the names and types of variables to send representing new state.

1C. Creating Resources Accessible by a Call Router API

The step of creating call router resources accessible through an Application Programming Interface (API) S130 preferably functions to expose information and/or functionality of the call router. The interaction from outside parties is preferably performed via the API (call router API). The Call Router API may additionally cooperate with the use of telephony instructions to function as a storage and retrieval format for data generated or required by the call router's operation. The Call Router API is preferably an application programming interface (API) such as a REST API (Representational State Transfer) as is known in the art, but the Call Router API may alternatively be a SOAP (Simple Object Access Protocol) API or any suitable programmatic communication interface. The Call Router API preferably may be used by an application asynchronously to the execution of a call (such as to later query the call records or retrieve recordings). Alternatively, the Call Router API may be used synchronously during the course of a call (such as to alter the state of the call, hanging up a call, initiating call recording, etc.). The Call Router API preferably stores state information in a persistent URI for a resource. The persistent URI preferably contains all the necessary state information, and this preferably makes data persistent, queryable, and recoverable. The Call Router API is preferably used for modifying resources to alter state of call router and for interacting with media of the call router. An application server can use the Call Router API to preferably query meta-data of call records, caller identification, call media (such as recordings, text transcripts, etc.), account information, transfer or interact with in-progress communications in the call router, and/or any suitable data generated by or required to operate the call router. The Call Router API preferably involves communication between an application server and a call router, but may alternatively be communication from any suitable device to the call router. The Call Router API preferably resides on the same hardware as the call router, but may alternatively reside on remote hardware or on any suitable hardware environment. The communication is preferably HTTP, but alternatively HTTPS or any suitable communication protocol may be used. The Call Router API may additionally be compatible with any HTTP client. The telephony system of the preferred embodiment preferably implements a Call Router API that includes a Call Router API request format, a Call Router API response format, and a plurality of API Resources representing types of data generated by or used by the Call Router.

The Call Router API request of the preferred embodiment functions as a communication message sent from an application server to an API resource of the call router. The Call Router API request is preferably sent from an application server to a call router, but may be sent from any suitable device to the call router. The Call Router API request is preferably similar to a REST API request, but the Call Router API request may alternatively conform to any suitable programming principle, such as SOAP. The Call Router API request preferably uses HTTP to interface with a resource, but HTTPS or any suitable communication protocol may be used. Preferably the HTTP or HTTPS method of GET is used to retrieve a resource or resource information, and the HTTP or HTTPS method of PUT or POST is used to create or update a resource. In some cases, PUT or POST may be used to affect the functionality of the call router by modifying the state of a resource. Alternatively, a method parameter may be included in the URI of the resource to identify a requested action for the resource, or any suitable commands or methods may be used to interface with an API resource. The Call Router API request preferably includes authentication such as basic HTTP or HTTPS authentication, by including message authentication information in the URI, such as a cryptographic hashing of the request content using a shared key, or by any suitable method.

The Call Router API response of the preferred embodiment functions as a communication sent in response to a method performed on an API resource. The Call Router API response is preferably sent from the call router to an application server, or any suitable device. The Call Router API response is preferably sent in response to a Call Router API request, and the response is preferably sent to the originating device. The Call Router API response is preferably similar to a REST API response, where the response is a representation of the requested resource. The Call Router API response may alternatively conform to any suitable programming principle such as SOAP. The Call Router API response is preferably returned as formatted XML with information corresponding to the HTTP status code, a message, error codes, and/or any suitable information related to the resource. The Call router API response may alternatively be represented as Comma-separated values list (CSVs), HTML, JSON, or any suitable format. In one variation, the response format is determined by a portion of the requested URI, such as a file extension. In one variation, an API resource may be a binary data resource, and the Call Router API response is preferably formatted in a native binary format (e.g., a way or mp3 audio file), an XML meta-data description, and or any suitable format.

The API resource of the preferred embodiment functions as an addressable representation of call router meta-data, internal call router state, or the state of a given resource used by the call router. An API resource is preferably addressed by a persistent URI. Preferably, the API resource responds to at least one HTTP action of POST, PUT, GET, or DELETE. The API resource may alternatively respond to multiple HTTP actions. The API resource may alternatively respond to any suitable method(s) that are preferably included in the Call Router API request. Consistent with the RESTful conventions, a GET request of a resource may return the current state of a resource, while PUT may update the state, PUT or POST may be used to create a new resource, and DELETE may be used to destroy a resource. The call router API may alternatively be used to affect the functionality of an in-progress call in addition to modifying data. The API resources of the preferred embodiment include an account resource, caller ID resource, incoming address resource, call resource, media resource, and/or any suitable resource of the call router. The API resources may alternatively be any suitable combination of the listed resources or other suitable resources. An API resource is preferably a preconfigured (or "static") resource, such as account information, or a resource actively in use by the call router, such as a phone call. Modifying the state of a resource via the API may additionally affect the operation of the call router in real-time, affect the state or capabilities of the call router in the future, and/or have any suitable effect.

The account resource of the preferred embodiment functions to allow an application to retrieve and/or modify account information. An account is preferably created by a telephony service provider, such as the operator of the call router. Information such as account name, usage information, contact information, initial URI, setup parameters, or any suitable account information may be retrieved or edited by an application using the account resource.

The caller ID resource of the preferred embodiment functions to allow an application to retrieve, modify, register new caller ID's (phone numbers), and/or delete caller identification information. The caller identification information is preferably for the phone number associated with out-going calls made by an application and/or user (i.e. where the application appears to be calling from). The numbers for outgoing calls are preferably assigned or verified prior to being used as a caller ID. As an alternative, to prevent fraudulent use of caller ID phone numbers in applications, a verification step may be used by the API before adding a new caller ID resource. A request to add a caller ID may be initiated via a request to the API, wherein a random validation code is generated and returned in the API response. The validation code is preferably provided to an end user. A phone call is placed to the given phone number (caller ID), requesting that the validation code be entered via keypad digits or spoken. Entry of the validation code verifies possession of the phone number, or the device associated with the phone number, at the time of the request. Use of the caller ID resource may additionally be presented in a user interface, such as a web browser, by displaying the verification code. User interface may be provided by the operator of the call router, or may be provided by any suitable application using the API. Any suitable method may also be used for verification of a caller ID. In another alternative, where multiple parties are involved in a call, the caller ID of one of the existing party members may be assigned for additional outgoing calls during that call session.

The incoming address resource of the preferred embodiment functions to allow an application to get, modify, or provision new inbound DID phone numbers, SMS short codes, SIP Addresses, etc. for use with applications. PUT or POST may be used to set the initial URI associated with the inbound address. DELETE may be used to release the resource. The incoming address resource may be used for real-time provisioning of phone numbers or other addressable inbound identifiers.

The call resource of the preferred embodiment functions to allow an application to get or modify the state of a telephony session in the call router. A telephony session or call may be in-progress, completed, failed, not yet initiated, and/or in any suitable call status. A call resource can preferably change the state or connection of an in-progress call. State changes preferably include: hanging up or terminating existing telephony sessions, transferring one or more existing telephony sessions from one contextual group of sessions to another, merging or splitting an existing group telephony sessions, transferring one or more telephony sessions from one communications medium to another (such as from one URI to a second URI), injecting an event or notification into a existing session or group of sessions, recording or ceasing to record the audio from one or more parties on a call, and/or any suitable call action. Call information or call log data can preferably be retrieved by sending a GET to the call resource or by alternatively sending any suitable method. Outgoing calls may also be initiated by using a POST or any suitable method that preferably indicates that a new call resource is to be created. When using the call resource to initiate a call, information may be provided as required to place a phone call, such as a caller ID to present, a phone number to call, and/or a URI to handle the call, but alternatively any suitable information may be provided. A call instruction XML document may alternatively be provided to the API instead of a URI, which is to be used for call instructions. The Call Router API may additionally respond with the status of a call such as if the call is answered, if a machine answered the phone, busy signal, no answer, call failure, and/or any suitable call status. The response may alternatively indicate that the new call request was accepted, but has not yet been initiated. In the example shown in FIG. 6, caller information and caller ID are included in a POST request to the call resource. This step would initiate an outgoing call to the phone number designated in the caller information. The Call Router API response includes available state information regarding the call, such as whether the call has commenced yet, the call start time, end time, price, caller info, and the Call Router API response could alternatively include any suitable information. Additionally, information about the call returned at any point by the API may depend on the status of the call. For example, a call start time would not be given if the call has not yet begun, or the call end time, duration or price would not be given if the call had not yet ended.

Figure 9:
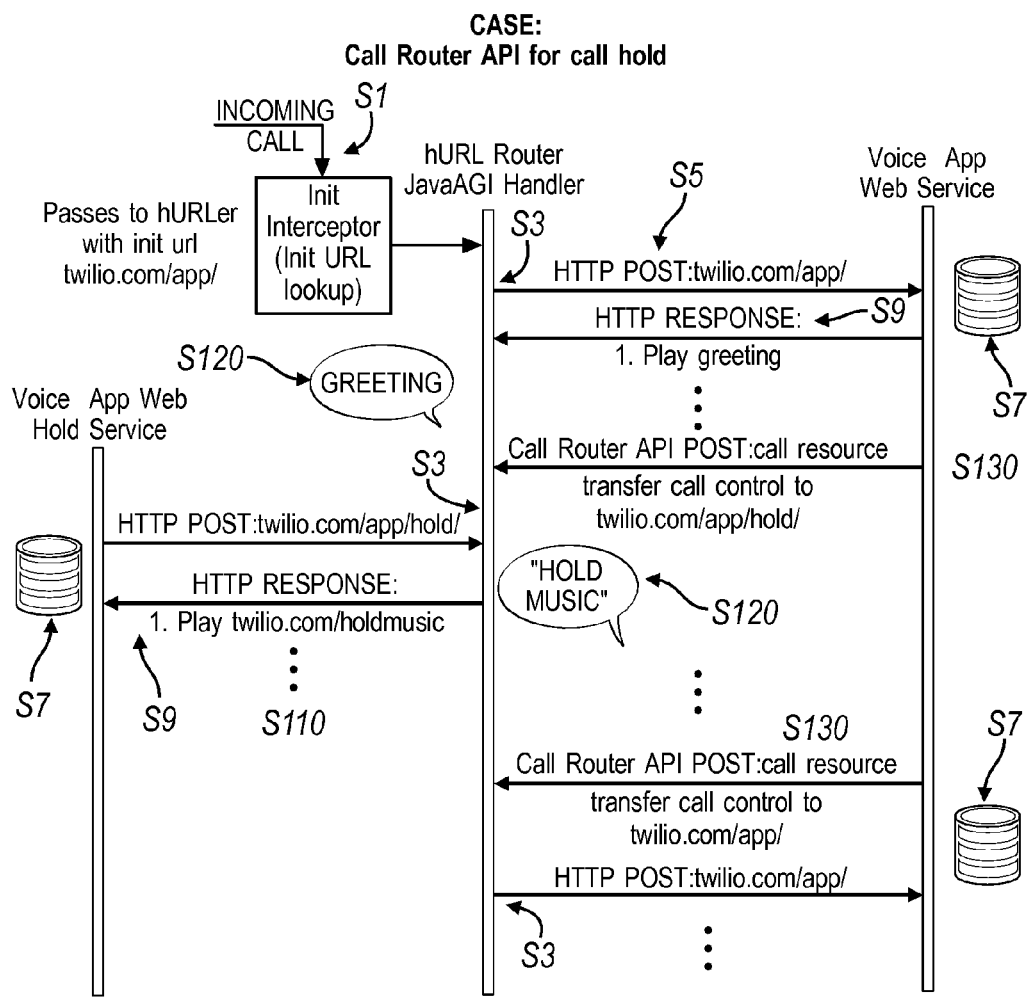

Additionally or alternatively, the call resource of the preferred embodiment may be used to transfer a call to a new URI by a single call resource receiving a POST, PUT, and/or any suitable method. In this alternative, a call is preferably transferred to the new URI for new call instructions. The API may preferably be used to issue asynchronous changes in call state, unlike the synchronous communication between the call router and application server for synchronous URI requests and responses. The call resource, in this alternative, functions to allow a call to be asynchronously directed to URIs. Examples of various applications of the call resource include initiating a new telephony session, terminating an existing telephony session, call waiting, call holding, call queuing, call parking, private call sessions within a conference, carry on multiple call sessions, and/or any suitable application. Any situation where asynchronous events affect the call status, such as a call agent becoming available, or a person returning to the phone after placing a caller on hold. The currently executing call router instruction may be allowed to complete, or may be immediately terminated, before requesting the provided URI. New call state resulting from the last call instruction executed by the call router, such as digits pressed on the keypad or audio recorded from the caller, may be provided to the new URI in a form POST or GET parameters, or may alternatively be discarded by the call router and not provided. As shown in FIG. 9, call waiting may be implemented by an application sending a Call Router API request to the call resource that POSTs a new URI for the call. The caller is then directed to the new URI for instructions. A second Call Router API request is sent to the call resource that POSTs the original URI for the call, and thus brings the caller back to the first call session. The call resource may alternatively be used in any suitable application.

As an alternative embodiment of the call resource, a calls resource may implement a plurality of individual calls as distinct subresources. For example, a URI ending in "/Calls"

may be a list of many calls performed by the account, and a URI ending in "/Calls/12345" may represent one specific call, uniquely identified by the key "12345". The calls resource preferably allows retrieval of many call records and/or creating new calls, while a single-call resource represents a single call. The calls resource preferably accepts a request to create a new call resource, as is common in RESTful architectures, which in the Call Router API, preferably serves to initiate one or more new calls. A calls resource may be used to both list current and previous calls using the GET method, as well as initiate a new outbound call using the POST method. Using RESTful principles such as POST or PUT to alter the state of an individual call resource can preferably change the state of an in-progress call, affecting the realtime activities of the call, such as by hanging up, transferring control to a new URI, joining the call with another call, or any suitable telephony action.

The media resource of the preferred embodiment functions to allow an application to retrieve and/or access information of media stored, cached, created, and/or used during a call. In one variation, the media resource is preferably a recording resource to access information and recordings made during a call via recording call instructions, or asynchronously via the Call Router API. In another variation, the media resource may alternatively include call transcripts, text messages, key press logs, faxes, a binary-coded resource, and/or any suitable media. The media resource may alternatively include a URI of the binary-coded file (such as a way, mp3 audio file or PDF document file). In one variation, the media resources may additionally be integrated with the telephony instructions (or markup language) such that a telephony instruction may instruct the call router to perform an action that creates a media resource. The call router preferably sends a response to the application server with the URI of the created media resource. For example, when the call router is instructed to record a message, the call router preferably sends a response to the application server with a unique URI of the recorded message within the API. The media URI preferably responds to GET requests to return the media in a number of formats, such as binary or XML meta-data representations. The media resource may accept requests to delete a media resource. In one variation, the media resource preferably requires authentication to access the resource. In another variation, the media resource may not require authentication to enable URI embedding in a variety of applications, without exposing authentication credentials. In yet another variation, authentication is preferably performed via cryptographic hashing, such that credentials are not exposed to client applications that consume the media resources. In another variation, the media resource allows the initiation of transcription of audio resources to text using transcription technology. The audio resource used for transcription is preferably generated during telephony sessions (such as by using the record instruction) and hosted on the Call Router API. The media resource preferably allows retrieving or deletion of audio transcriptions generated from recorded media. The media resource may additionally allow centralized hosting of media files, and the resource URIs are preferably exchanged between the call router and the application server, instead of the large media files themselves. The media resource may alternatively be used for any suitable media.

Additionally or alternatively, a join resource of the preferred embodiment may be used to join one or calls into a shared session that allows the parties to communicate (i.e., a conference) by a single call resource receiving a POST, PUT, and/or any suitable method. In this alternative, one or more calls are preferably join together such that they are in a conference. The join resource may alternatively be a subresource or part of the call resource.

Additionally or alternatively, a split resource of the preferred embodiment may be used to split shared sessions (e.g., a conference) into individual call sessions by a single call resource receiving a POST, PUT, and/or any suitable method. In this alternative, one or more shared sessions involving two or more calls are preferably split such that one or more calls are split into separate calls or into on or more separate conferences. The split resource may alternatively be a subresource or part of the call resource.

2. Method of Caching Media for use in a Telephony Session

Figure 12:
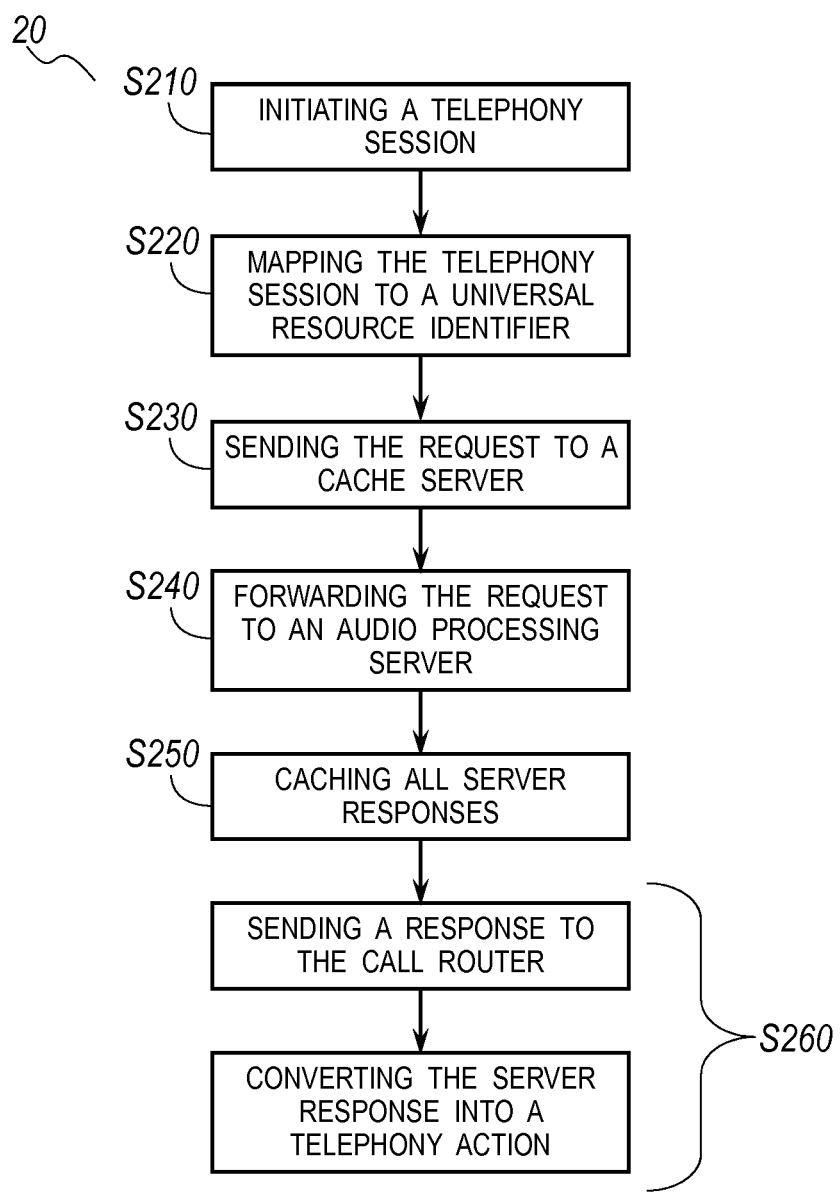
FIG. 12 is a flowchart diagram of a preferred method.
Figure 13:
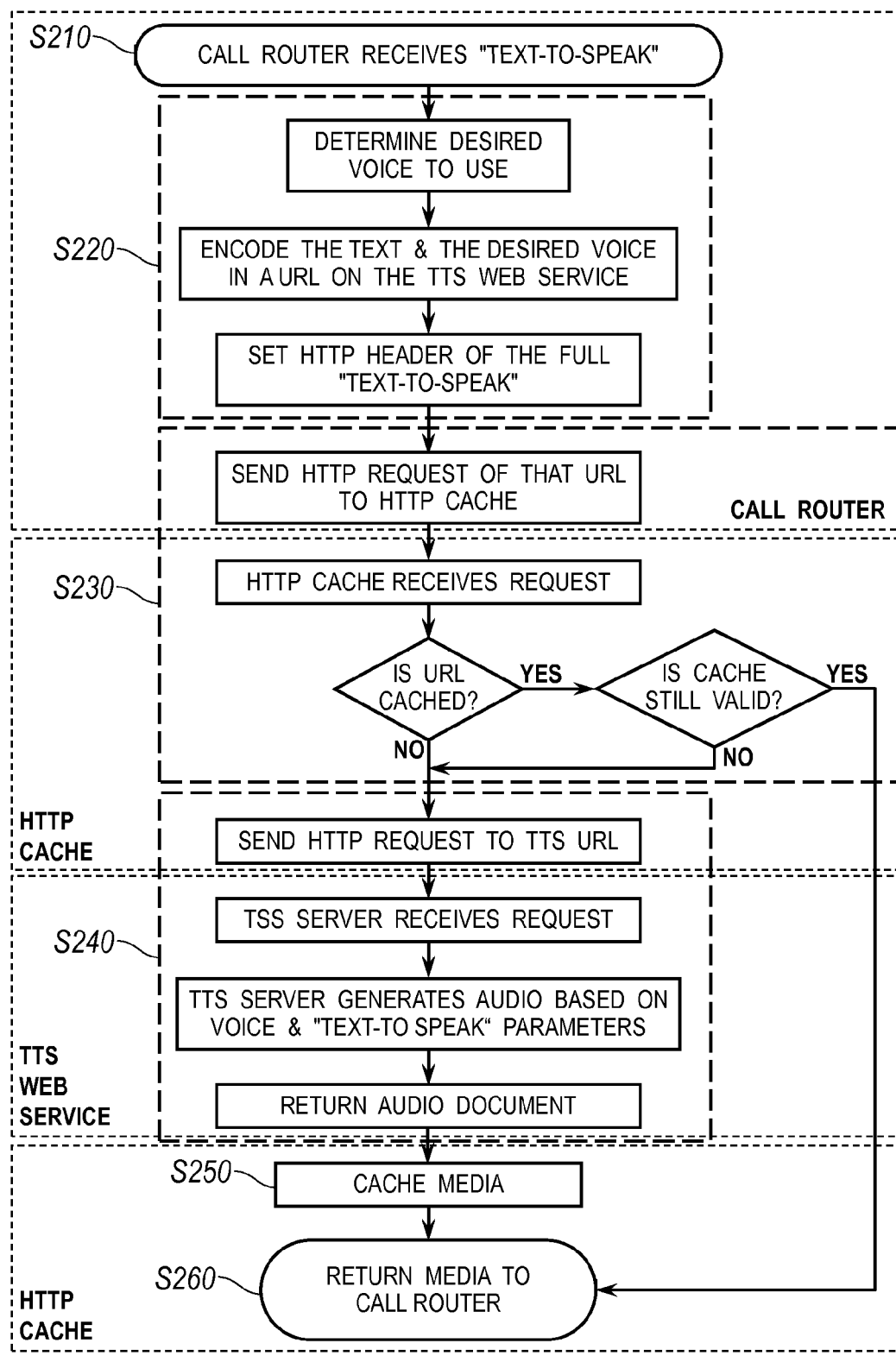
FIG. 13 is a flowchart diagram of a first preferred variation of the preferred method, including a Text-To-Speech audio conversion.
Figure 14:
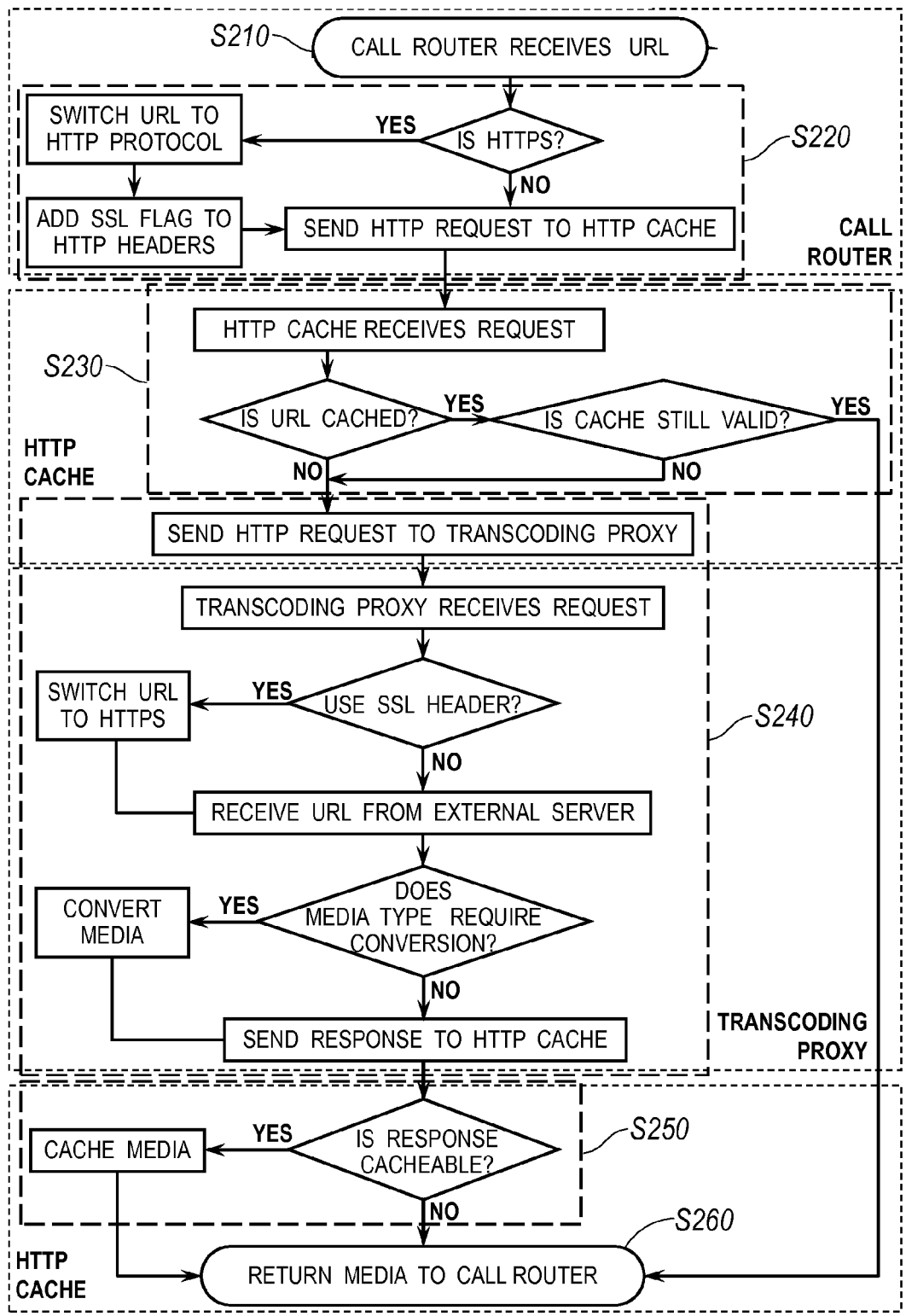
FIG. 14 is a flowchart diagram of a second preferred variation including audio transcoding.
Figure 15:
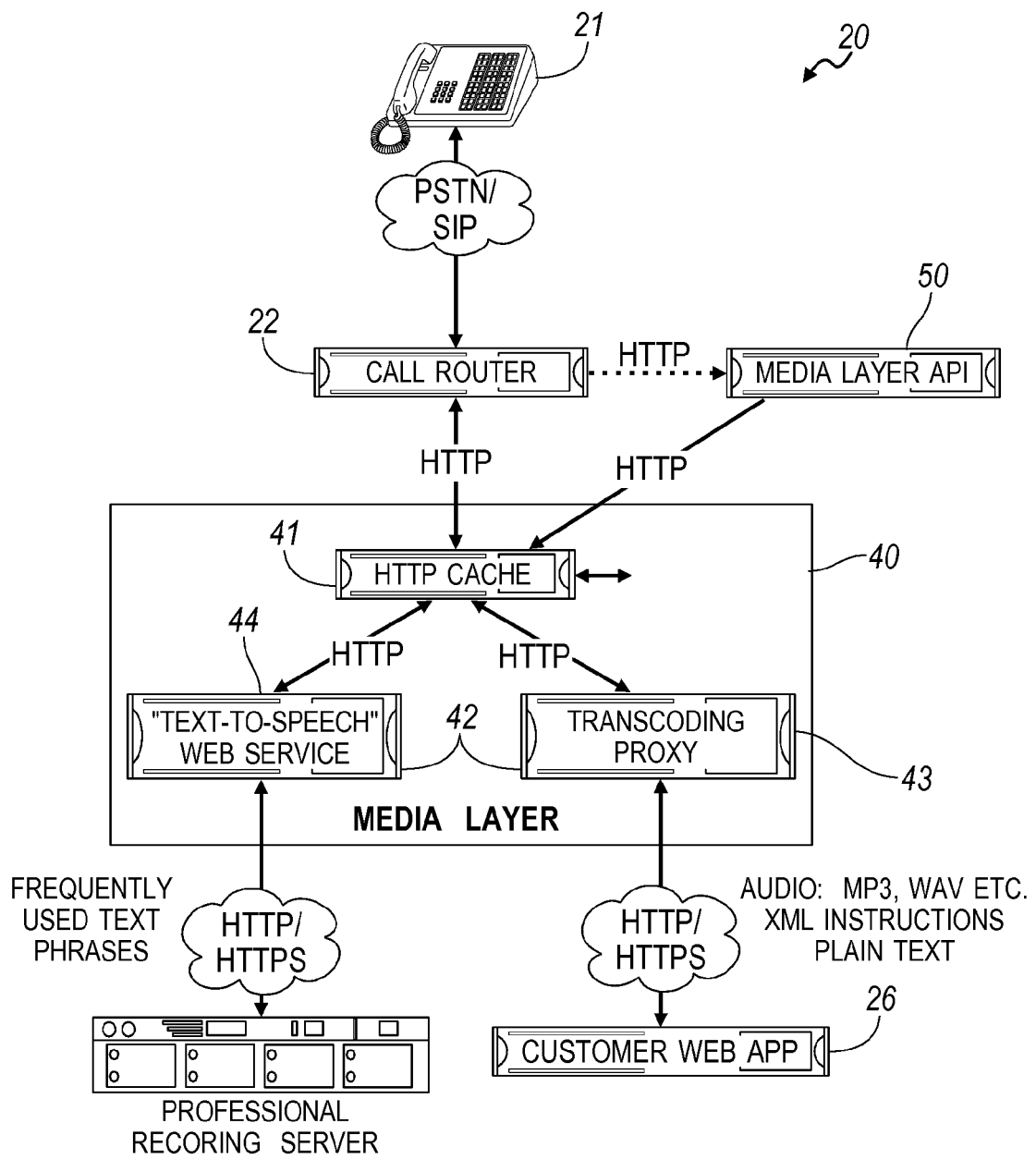
FIG. 15 is a schematic diagram of the preferred embodiment interfacing with a professional recording server.

As shown in FIGS. 12-14, the method 20 of the preferred embodiment for processing media includes mapping a telephony media request to a resource address S220, sending the request to a cache server S230, forwarding the request to a media processing server S240, and caching responses S250. The method functions to generate telephony compatible media resources for improved efficiency. In one application, the method is preferably implemented during a telephony session, and is more preferably implemented during a telephony session established using the method 10 for processing telephony sessions. In this variation, the method 20 preferably includes the additional steps of initiating a telephony session S210, and after caching the response, sending the response to a call router S260, where the call router preferably executes the media resource. In another variation, the method is implemented with media layer API interaction. The media layer API preferably provides media layer control beyond normal capabilities (such as those possible by HTTP caching directives). Third party servers or applications preferably use the media layer API, but alternatively the call router may use the media layer API. This variation may be implemented outside of a telephony session or during a telephony session. The method 20 functions to handle call flows from a call router and uses a media layer to streamline network traffic and transparently handle aspects of application specific processing. The method preferably uses less bandwidth and stores the results of computationally intensive operations and/or large network transmissions to improve the perceived responsiveness of telephony systems to callers. The method additionally lowers the cost of service by enabling a larger volume of calls to be handled using the same CPU and network resources. The method 20 preferably utilizes a HTTP media transport protocol for the services of the media layer. HTTP is preferably used for external communication and for internal communication of the media layer. This allows the physical systems of the media layer (e.g., transcoding proxy servers, text-to-speech servers, encryption servers, etc.) to be distributed across different network-isolated systems and to be scaled independently. The use of the HTTP protocol additional enables the dynamic and automatic scaling of resources within the media layer. Systems of the media layer such as caches, text-to-speech servers, transcoding proxy servers, or other media processing servers may all be automatically load balanced independently of other systems.

Step S210, which recites initiating a telephony session, functions to accept an incoming call. The call preferably originates from PSTN-connected (Public Switched Telephone Network) or Internet addressable devices, such as landline phones, cellular phones, satellite phones, Voice-Over-Internet-Protocol (VOIP) phones, SIP devices, Skype, Gtalk, or any other suitable PSTN-connected or Internet addressable voice device. The originating phone number of the PSTN device is preferably captured using caller ID, but any other suitable ID may be captured, such as a VOIP provider ID. The dialed phone number and/or the date and time of the call are also preferably included in the session information. An authentication ID may additionally or alternatively be included in the session information. Step S210 is preferably substantially similar to Step S1 of method 10 for processing telephony sessions.

In one preferred variation of the invention, Step S210 functions to initiate a telephony session (such as a phone call) via an HTTP or other request sent to a call router from an application running on a third-party server. In this variation, the web application running on the server preferably specifies an initial URI of an application server for the call router to use for the telephony session as well as the phone number (or other addressable destination) to dial, geographic information and the source phone number (caller id).

Step S220, which recites mapping a telephony media request to a resource address functions to convert a telephony session into a format that may be handled with standard web servers and web applications. The telephony media request is preferably received during a telephony session, but may alternatively be received from the media layer API when a telephony session is not established. A call router may preferably receive the media request or alternatively the media layer API may receive the request. Additionally a call router may initiate the media request and use the media layer API to interface with the media layer. The telephony session is preferably mapped to a Universal Resource Identifier (URI), but any suitable resource addressing protocol may be used. Step S220 is preferably substantially similar to Step S3 of the method 10 for processing telephony sessions. Preferably, the mapping and/or conversion are performed using a call router. The initial address or URI is preferably pre-specified at the call router by a web application (which may be running on a third party server) or call router account owner. More preferably, the initial URI is assigned to the call via a unique identifier for the call destination, such as a DID (Direct Inbound Dial) phone number, or a VOIP SIP address. In another preferred embodiment, the URI is specified by a remote server. Alternatively, the media layer API may specify the resource address using any suitable interface, but the media layer API is preferably a REST API. The URI may encapsulate at least a portion of the state information from the initiated telephony session, such as the originating phone number, the dialed phone number, the date and time of the call, geographic location of the caller (e.g. country, city, and/or state, zip), and/or the unique call ID. The URI is preferably associated with a media resource such as a media file location or a location of a media processor or generator. The URI may additionally include media parameters. The media parameters are preferably used in the processing or generation of a media file. The parameters may additionally or alternatively be embedded in the header or body of an HTTP message. The information included in the URI may be included in the form of a URI template. For example the URI default template could be:

http://demo.twilio.com/myapp/{dialed phone number}/ {originating phone number} or http://demo.twilio.com/myapp/ foo.php?dialed_number={dialed phone number}& originating_number={originating phone number}

In one variation, the request is preferably made via a secure protocol, such as HTTPS. The HTTP header containing the request preferably includes an SSL header, indicating the final forwarding of the request to the URI is to be performed using SSL (HTTPS authenticated requests). This adds an additional layer of security to the application server, protecting valuable content from being accessible, protecting privacy of all communicating parties, and protecting the application server from malicious activity while allowing internal components, such as cache servers or transcoding proxies, to process request and response data.

In another variation of Step S220, plain text or XML of Text-To-Speech instructions are converted into a Text-To-Speech (i.e., speech audio) via an HTTP request sent to a URI of a Text-To-Speech web service. The call router preferably constructs a URI consistent with the Text-To-Speech web service when the call router determines a Text-To-Speech process is needed. The call router preferably sends the URI request to the Text-To-Speech web service, and more preferably sends it via the cache server. The call router preferably makes the request based on program instructions, media received from an application server, or any suitable event. The HTTP request preferably includes the desired Text-To-Speech conversion (text, voice type, speech speed, and/or any suitable setting) and the full text to be converted. The URI preferably includes the full text to be converted. The URI may alternatively include a fixed length cryptographic hash of the desired conversion including the full text. The full text is preferably included in the HTTP headers. This alternative functions to provide a unique URI for a specified conversion but having the URI limited to a certain length. The Text-To-Speech conversion request also preferably includes a voice selection (e.g. female, old man, child, etc.), but alternatively if no voice is selected, a default voice may be used for the converted speech. In one variation, the Text-To-Speech conversion request also includes a language specification to specify the language to be used for the conversion.

Step S230 functions to send the request to a cache server. Preferably, the request for a URI is sent to a cache server over a network. Step S230 preferably includes the cache server checking if the requested URI is already cached. The cache preferably stores telephony compatible media files. Telephony compatible media is preferably media in a suitable format for use with a telephony device. The media file may have previously been processed within the media layer prior to being cached or have been created by an application operator in a telephony compatible state. The telephony compatible media file and the original media file (the requested media) do not necessarily share a common media description and could differ in sampling frequency, bit rate, media type, or any suitable characteristics. For example, a video file is preferably stored as an audio file when a telephony compatible media file is cached. The URI of a telephony compatible media file is preferable cached with a persistent URI (or persistent address). The persistent URI functions to allow media to be requested which does not necessarily correspond to the media returned. This is an aspect of the transparent description of the media layer where the processing and caching operations of the media layer are carried out without the knowledge of the call router. When a URI specifying a video media file is requested, a telephony compatible audio file that has been cached and associated with that persistent URI is preferably returned. The media parameters embedded in a URI can additionally be used to identify cached media. For example, audio of a Text-To-Speech conversion is preferably cached with a media parameter describing the contents of the media, such as a cryptographic hash or the actual text voice settings, or any other Text-To-Speech variables. If the URI has been cached and the cache is still valid (based on an HTTP expires tag, a HEAD request to the URI resulting in a 304 "Not Modified", or any other suitable cache maintenance algorithm), the cached content is returned to the sender, and Steps S240 and S250 are preferably skipped. However, if the URI has not been cached, or the cache is determined to be invalid (e.g. due to expiry, URI updates, etc.), then the HTTP request is preferably forwarded to another media layer server (e.g. a transcoding proxy server and/or a Text-To-Speech conversion server, or any other suitable server in the media layer) or the application server for processing. Using a dedicated hardware for process specific tasks functions to increase processing time and improve time response. In one variation, the request is sent to a local cache server on a local area network. In another variation, the request is sent to a server running locally on the device originating the call. In yet another variation, the request may be sent to multiple servers. In another variation, the request may be sent to another cache server if the cache is partitioned or hierarchical. The state information from the initiated telephony session is preferably sent via HTTP POST, HTTP GET or HTTP header parameters to mimic the data flow of a web browser. Communication between the cache and other media layer servers (e.g., media processing servers) is preferably operated in a controlled or trusted environment (e.g., an intranet) and a non-secure communication protocol such as HTTP is preferably used. Alternatively, the cache may use third party or external servers for storing media. In the case where external networks or servers are accessed, a secure communication protocol such as HTTPS may alternatively be used.

Step S240 functions to forward the request to a media processing server. The media request is preferably processed within the media processing server. The media processing server is preferably an audio processing server but may be any suitable signal processing server. In a first variation, the media processing server is a Text-To-Speech web service. In a second variation, the media processing server is a transcoding proxy server. In a third variation, the audio processing server includes both the Text-To-Speech web service of the first variation and the transcoding proxy server of the second variation. The media processing server preferably generates a telephony compatible audio file, but may alternatively perform any suitable task. In the case where the telephony device is an SMS or MMS device the telephony compatible media generate may be text or images compatible with the messaging service. The processing server is preferably capable of streaming media content to a destination.

As shown in FIG. 13, the first variation of Step S240 includes the step of converting Text-To-Speech. The text to be converted is preferably included in the URI or in an HTTP header as described above, and also preferably includes a specification of a Text-To-Speech conversion (text, voice type, speech speed, and/or any suitable setting) as media parameters. The Text-To-Speech audio is preferably generated based on the voice selected and any other suitable Text-To-Speech parameters such as language, emotion, talking speed, G-rated, etc. The audio is preferably generated as 8-bit PCM mono with 8 kHz bandwidth (the standard for telephony voice communication), but may alternatively be generated as a binary audio file such as an MP3 file, a WAV file, or any other suitable binary audio file. The audio file is preferably transmitted back to the cache server, but may alternatively be transmitted directly to the call router, or to a transcoding proxy server for audio transcoding. The transmitted audio file may additionally be streamed to a destination location (e.g., streamed to the cache server).

In one further variation of the first variation of Step S240, the step of converting Text-To-Speech may be reversible (e.g. speech to text) and the forwarded request may include a binary audio file to be converted to text. This further variation may include transmitting the converted text to a caller via SMS, email, TTY or any other suitable transmission medium.

One variation of the first variation of Step S240 preferably includes the step of automatically selecting and professionally recording frequently used words and phrases. This variation of Step S240, preferably includes the step of determining frequently used words and phrases, where the frequently used words and phrases are preferably defined to be words and phrases used more than a pre-specified frequency over a period of time. The frequently used words and phrases may alternatively be specified by an application operator. A Text-To-Speech telephony instruction may include an API flag or any suitable mechanism indicating that the phrase should be professionally recorded. The frequently used words and phrases are preferably transmitted to a professional recording studio where the words and phrases are professionally recorded by a voice actor in a studio. The transmission is preferably email, but may alternatively be an SMS message, a fax, a mailed document, or any other suitable transmission. The professional recording may be recorded word by word, phrase by phrase, with multiple intonations, or any other suitable recording methodology. The professional recording is preferably transmitted electronically to an application server, but may alternatively be transmitted to a Text-To-Speech conversion web service, a cache server, a transcoding proxy server, a call router or any other suitable web server. The professional recordings are preferably transmitted in 8-bit PCM format, but may alternatively be transmitted in WAV, MP3, or any other suitable audio format. The return transmission of the professionally recorded audio files is preferably an HTTP post request, but may alternatively be an FTP transfer, an email, a mailed data storage device (e.g. CD ROM, memory card or Flash Disk) or any other suitable transmission.

As shown in FIG. 14, the second variation of Step S240 includes the step of transcoding an audio file of a URI resource on an application server. In this variation, the HTTP request is forwarded from the HTTP cache server to the transcoding proxy server that requests a URI from an application server. The transcoding proxy server additionally may use a secure protocol during communication with the application server. The secure protocol is preferably HTTPS, though any suitable secure protocol may alternatively be used. The use of the secure protocol is preferably indicated by an instruction included in the headers of the HTTP request from the call router and alternatively via the HTTP cache. The second variation of Step S240 also includes retrieving the resource located at the URI from the application server. Upon receipt of the resource, Step S240 includes the step of determining if the media type requires conversion. The transcoding proxy server may additionally determine if conversion is required or desirable for a media file by analyzing the MIME-type of a media file. The transcoding proxy server preferably uses a preconfigured MIME-type to transcode audio to another MIME-type (e.g. from 128 Kbps MP3 audio to 8-bit PCM mono with 8 kHz bandwidth for telephony applications). Media conversion instructions, such as which MIME-types should be converted into which other formats, may be pre-configured on the transcoding proxy server, or may be passed at the time of the HTTP request from the call router and/or HTTP cache server. If the media type does not require conversion, the media resource is sent forwarded without modification. The application server response is then sent to the HTTP cache server for possible caching, but alternatively may be transmitted directly to a call router if needed. The transcoding proxy server may alternatively stream the resource located at the URI from the application server, sending response data to the cache server or call router as it is downloaded and/or transcoded, without waiting for the complete operation to finish.

As another variation the Step S250 may include encrypting media. This step functions to cache media in a secure format. The media encryption preferably happens to the media file being cached. Media that is needed for a telephony session is preferably not sent to the call router encrypted. Either a non-encrypted telephony compatible version of the media file is sent to the call router, or alternatively, the media file is decrypted prior to transmitting to the call router. Step S250 may include decrypting media. When decrypting media a shared key is preferably shared between a client (application operator) and the system administer. However, an encrypted media file may be passed back to the client (using the media layer API) in situations where the client desires to not transmit decrypted media.

Step S250, which recites caching possible server responses functions to reduce redundant data transmissions and streamline network traffic. This reduces bandwidth and processing resource usage and lowers the cost of service by enabling a larger volume of calls to be handled per computing resource unit, while improving the perceived response time for callers. Preferably, Step S250 includes caching all server responses received from application servers and servers in a media layer, such as a transcoding proxy server response, a Text-To-Speech web service response, an application server response, or any other suitable server response. Step S250 preferably checks if the response is cacheable, for example caching a common audio response delivered either as an audio file directly from an application server, a transcoded audio file, an audio file containing converted Text-To-Speech. Customized content (e.g. personal voice mailbox recorded messages) and private personal data files (e.g. bank account balances) are preferably not cached. Alternatively, the HTTP response of the application server may include cache-related directives. The cache-related directives are preferably included in the HTTP headers, and include instructions for handling the URI resource. More preferably, the instruction includes whether or not a HTTP response is cacheable and/or the expiration of the URI resource (how long the URI resource remains cached on the cache server). The cache preferably deletes the URI resource when the expiration time has been reached. Alternatively the media layer API may alternatively be used for cache control. Though, any suitable cache-related directive may alternatively be used. The cache may additionally store media on an external server. The external server may be operated by a third party or be located in a remote location. The media is preferably encrypted in this variation such media stored in uncontrolled servers does not have compromised security. When retrieving media from the external server, the media layer may handle the decryption or alternatively pass the encrypted media onto the client such that the media layer never observes unencrypted media.

Step S260 functions to send a response. The response is preferably an audio file or XML call flow instruction file for playback and processing. The response is preferably sent to the call router if the call router originated the media request. Alternatively, the response may be sent to a destination specified by the media layer API, preferably the server using the media layer API. The response is preferably sent as XML, audio binary, or raw text, but may alternatively be any sort of messaging format, including HTML, delimited text, key/value text or binary encoded format. The response is preferably sent to the call router independently of whether or not the response is cached. This response is preferably an HTTP response. The HTTP response preferably includes directions to perform at least one telephony action (e.g. play this file, connect to this number, access this URI). The telephony compatible media file is preferably played by the call router for the telephony device. In one variation, the cache server streams the response to the call router, sending response data as it becomes available without waiting for the entire response. The call router consumes the media in a number of variations. The call router may consume a HTTP media stream and render the audio over the PSTN, VoIP network, or any suitable network to the telephony devices. The call router may append the data from the media layer to a file as the data becomes available and begin rendering the media from the file immediately (e.g., using a first in first out FIFO abstraction). The call router may append from the media layer to a file as the data becomes available and start rendering the media when the stream is finished.

3. System for Handling Telephony Sessions

Figure 2A:
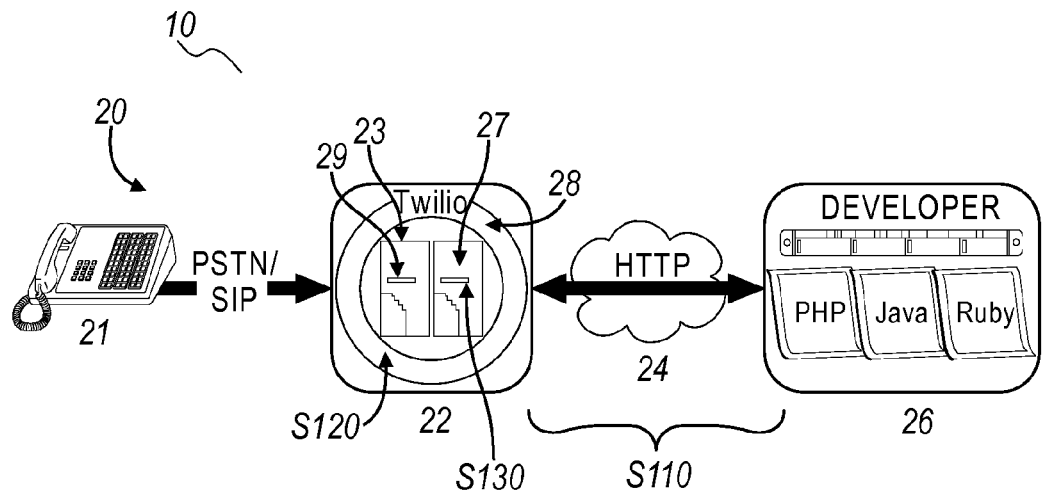
FIGS. 2A, 2B, 3A and 3B are schematic representations of preferred embodiments of the invention.
Figure 2B:
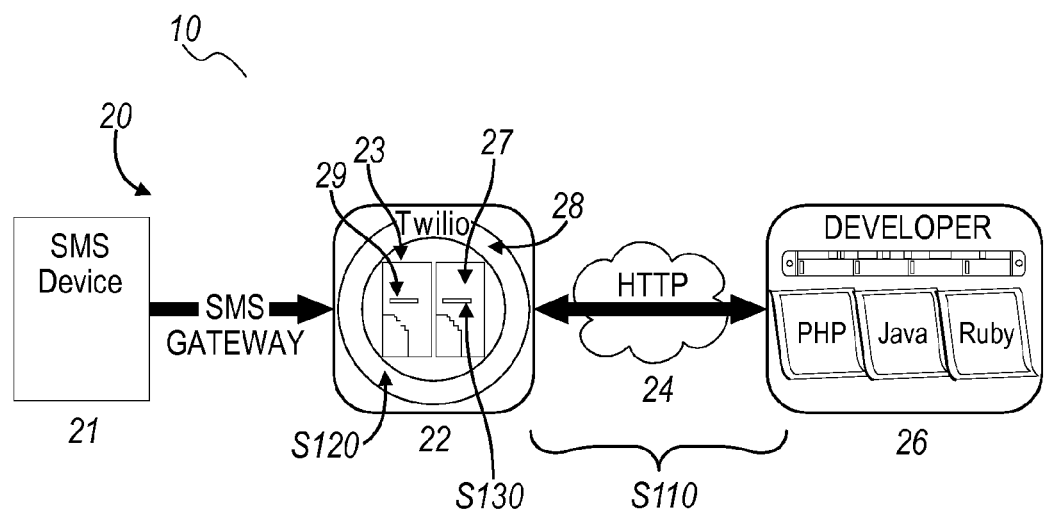
Figure 3A:
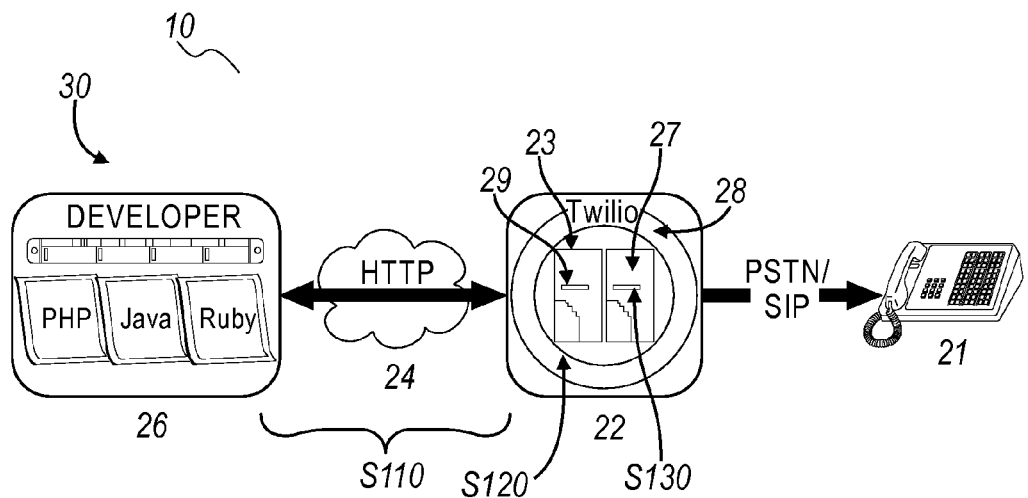
Figure 3B:
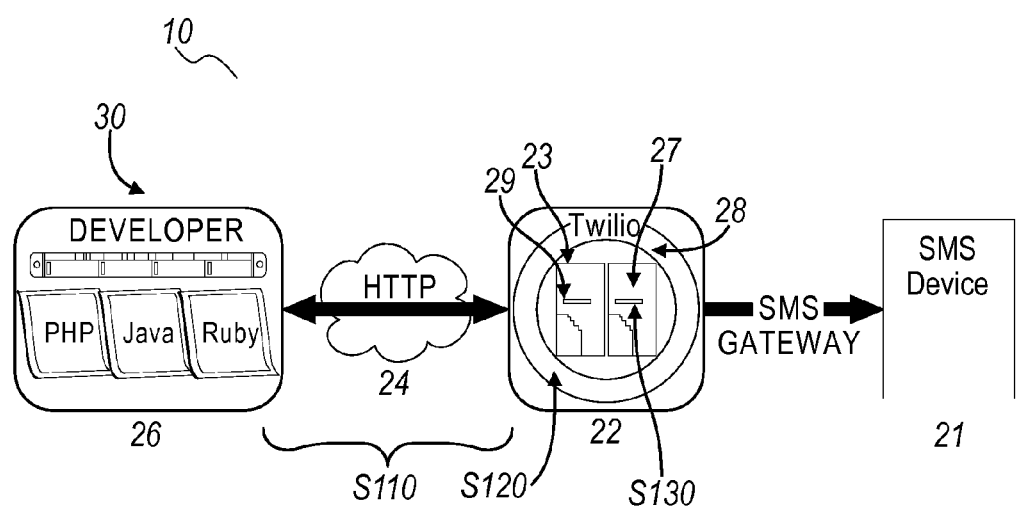
Figure 11:
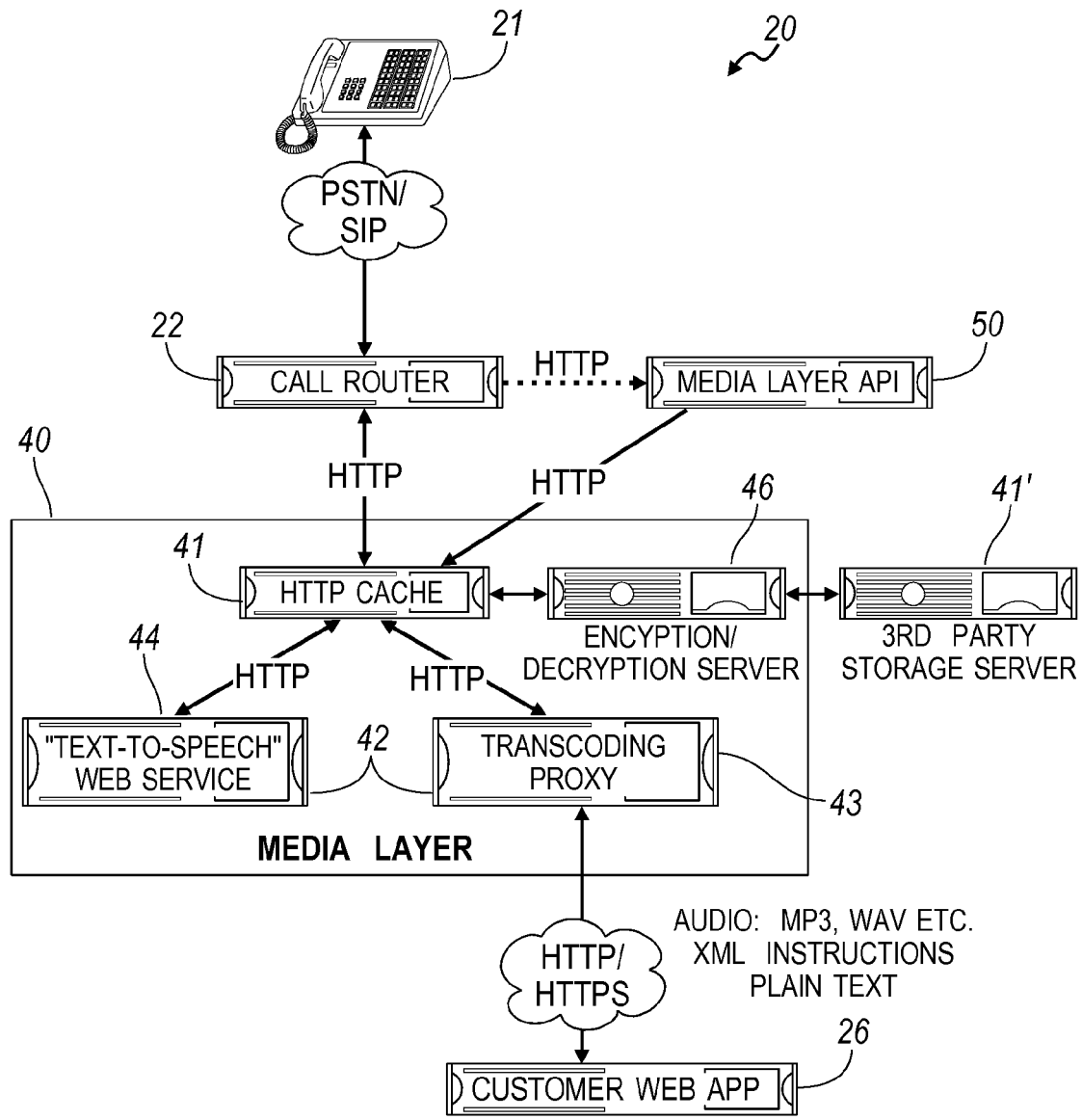
FIG. 11 is a schematic diagram of the preferred embodiment of the invention.

As shown in FIGS. 2A, 2B, 3A, 3B, 11 and 15 a system 20 and 30 of the preferred embodiment for handling telephony sessions includes a call router 22, a resource address 23 for an application server, a telephony instruction 27, and a call router resource 29. As shown in FIGS. 2A and 2B, a first configuration 20 is initiated by a telephony device (such as a telephone call, fax or SMS message). As shown in FIGS. 3A and 3B, a second configuration 30 is initiated by an application developer side (i.e., server 26 calling out). The telephony system of the preferred embodiment preferably additionally implements a Call Router API 28 that includes a Call Router API request format, a Call Router API response format and a plurality of resources substantially similar to those described above. The system of the preferred embodiment additionally includes a media layer 40 that functions as an intermediary hardware/software layer for application media processing as shown in FIG. 11. The media layer 40 preferably includes a cache server 42 and a media processing server 42. The media processing server 42 may include a transcoding proxy server 43, a Text-To-Speech web service 44, and/or any suitable media processing device.

The call router 22 functions to initiate or receive calls from the telephony device and connect to a web-application server. The call router 22 is preferably connected to a PSTN device over the PSTN network, such that it can receive and make calls from PSTN-connected devices 21, such as landlines, cellular phones, satellite phones, or any other suitable PSTN-connected devices, as well as non-PSTN devices, such as Voice-Over-Internet-Protocol (VOIP) phones, SIP devices, Skype, Gtalk, or other Internet addressable voice devices. The call router 22 may alternatively or additionally function as or include a message router for use with SMS messages. The call router 22 can preferably connect to an SMS network, such that it can receive and send messages from SMS network devices 21, cellular phones, computers, smart phones, or any suitable SMS network devices. The call router 22 may also send or receive text messages, multimedia messages, emails, faxes and other suitable PSTN-compatible communication messages. The call router 22 preferably communicates with the application server 26 using an application layer protocol, more preferably using the HTTP, or secure HTTPS, protocol. The call router 22 preferably communicates with the application server 26 through a media layer 40 using the HTTP protocol or a secure protocol such as HTTPS. HTTP is preferably used for communication for devices networked through an intranet such as between the call router 22 and the media layer 40 and within the media layer 40, and a HTTPS is preferably used for communicating with external servers or devices. The communication between the application server 26 and the call router 22 is preferably stateless and any state information (e.g., call state) or data is preferably located in a URI or the request parameters, such as HTTP headers, GET URI parameters, POST request body parameters, or HTTP cookies. Available state information is preferably transmitted by call router requests to the application server for stateless processing, and the application server preferably stores no state. Alternatively, the application server preferably stores local state information, such as databases or sessions, as is common in web development. The call router 22 preferably stores state information in call router resources 29. The call router resources 29 are preferably accessible by the application server 26 and other devices through the call router API 28. The call router resources 29 are preferably similar to those described above. The call router 22 preferably associates each incoming phone number with a starting resource address (or more specifically a URI) 23, more preferably the URI 23 is provided by the application server 26, still more preferably the URI 23 is provided by the application developer before a call is received at the call router 22 by associating the initial URI with the incoming call address (such as DID, SIP address, etc.) or by the application upon initiation of an outgoing call. The call router 22 preferably sends call data such as the caller number (obtained via Caller ID), caller geographic data (country, city, and/or state, zip) the number dialed, the time of the call, or any other suitable information or parameter. When an HTTP communication is associated with a media request (e.g., a file request or a media processing instruction), the associated URI 23 is preferably a persistent URI. A persistent URI functions to allow telephony compatible media stored in the cache to be returned in place of the requested URI. The call data is preferably digitally signed with a secret key 25 stored on the call router 22. A cryptographic hash of the information is preferably included along with the information as a digital signature. The call router 22 may also encrypt sensitive information (either before or after the cryptographic hash is computed) using the secret key to allow sensitive information to be sent across the network. The call data is preferably sent as an HTTP POST request to the application server 26. Call data may also be sent in URL (GET) variables, or encapsulated in HTTP headers. An example HTTP request containing the information in the header is shown in FIGS. 4A and 4D. As shown in FIG. 4B, further inputs (such as voice recording or DTMF button pressing) from the PSTN-device may be subsequently submitted to the application server 26 as HTTP requests (GET or POST). As shown in FIG. 4C, the inputs from a phone keypad may be included in an HTTP GET request. As shown in FIG. 4E, the content of an SMS message received by the call router may be sent to the application server 26 as an HTTP request. As shown in FIG. 4F, the inputs from the text message are included in an HTTP GET request. The request data may alternatively be simultaneously sent in the URI (query string), message body (POST) and message headers, or any combination of the above. The call router 22 is preferably capable of handling media streams received by the media layer 40. The call router 22 consumes the media in a number of variations. The call router 22 may consume a HTTP media stream and render the audio over the PSTN, VoIP network, or any suitable network to the telephony devices. The call router 22 may append the data from the media layer 40 to a file as the data becomes available and begin rendering the media from the file immediately (e.g., using a first in first out FIFO abstraction). The call router 22 may append from the media layer 40 to a file as the data becomes available and start rendering the media when the stream is finished.

The preferred embodiment may additionally include a media layer Application Programming Interface (API) 50 that functions to allow programmatic access to the media layer 40 and in particular to the cache 41. The media layer API 50 is preferably RESTful in nature but any suitable protocol may be used. The media layer API 50 may be used for retrieving the status of a single cached resource, or alternatively a plurality of cached resources (what is cached, the date the media was cached, the file size, etc.). The media layer API 50 may additionally retrieve such status by specifying a partial or full URL to the canonical resource (i.e., show the cache status for the file located at: http://demo.twilio.com/foo.mp3). The media layer API 50 may additionally remove media from the cache. The media layer API 50 may request that one or more remote files be cached, specified as one or more URLs (ex: http://demo.twilio.com/foo.mp3) or request that that one or more remote URL resource that contains sub-resources be cached. For example, by requesting to cache http://demo.twilio.com/media/, the cache would preferably "crawl" that directory for sub-resources linked to, and cache those. Caching instructions such as media type, file size restrictions, modification date, or any suitable parameter may additionally be used for the crawling procedure. The media layer API 50 may alternatively or additionally be used by applications for any suitable purpose. One exemplary use of the media layer API 50 would be to preemptively cache media to the media layer. Such as if an application has media that will be commonly used or that changes on a periodic basis. Another exemplary use of the media layer API would be for accessing media generated during a telephony session after the telephony session has ended.

The media layer 40 of the preferred embodiment functions to streamline and reduce bandwidth usage. The media layer 40 preferably assigns CPU or network intensive tasks to dedicated hardware to improve the perceived response time for callers. The media layer 40 further functions to separate media processing from a core router and enable improved allocation of resources and scaling of infrastructure. The media processing is preferably transparent to the call router or other applications accessing the media layer 40 through the media layer API 50. Here transparent indicates that the call router 22 only needs to be aware of how to handle expected media (telephony compatible media). The media layer 40 preferably takes care of converting the requested media to a telephony compatible media type. Additionally, new media types can be implemented without modifying the operation of the call router 22. The presence of the media layer 40 may also lower the cost of serving each caller by reducing the bandwidth and computational resources needed, effectively increasing the number of simultaneous call flows handled by the call router 22 and the application server 26. The media layer 40 preferably includes a cache server 41 and a media processing server 42. The media processing server 42 preferably includes both a transcoding proxy server 43 and a Text-To-Speech web service 44, but alternatively, either a transcoding proxy server 43 or a Text-To-Speech web service 44 may be solely included in the media layer. Alternative servers or media processing devices may additionally be used. Each server is preferably run on an independent device, but alternatively, some or all of the servers 241, 242, and 243 in the media layer 40 may run on the same device. The media layer preferably includes the ability to stream data through each component of the media layer 40 (e.g., the cache, Text-To-Speech servers, and transcoding proxy servers). Streaming functions to minimize the delay when media is requested through the media layer 40. Each component of the media layer 40 is preferably capable of accepting a block of data, performing an operation, and writing that block out. Streaming is preferably implemented using HTTP 1.1 chunkedencoding, which allows data to be added, removed, or modified by intermediate nodes (e.g., transcoding proxy server). A load balancer may additionally automatically allocate or deallocate resources of the media layer. The load balancer (or a plurality of load balancers) preferably independently scales components based on independent usage and independent performance profiles (CPU-bound, disk-bound, etc.). Using the media layer, the stateful system components (e.g., the call router) are separate from the stateless components (e.g., the transcoding proxy servers, Text-To-Speech servers, etc.). Thus the components of the media layer are easily scaled for more capacity. Furthermore, because the components of the media layer communicate using HTTP, the components may be scaled independently. Additionally, since the media layer may be distributed, there is greater flexibility in the physical (hardware or software) implementation. Media layer 40 components may be operated on different kinds of hardware or virtualized resources. The components are preferably scaled automatically using the load balancer and may additionally use predictive techniques to anticipate capacity requirements. As one example, a client with a large Text-To-Speech demand may be doing high volume work. The Text-To-Speech services may be scaled up by allocating additional Text-To-Speech servers, without the need to alter the call router 22, transcoding proxy servers, or any other system components. When anticipating/predicting capacity requirements, the system may use usage history as an indicator of times of day when particular capacity requirements must be met.

The cache server 41 of the media layer 40 functions to improve the response time to the call router 22 and improve the quality of each call flow, while reducing usage of processing and bandwidth resources. The cache server 41 preferably accomplishes these goals by storing and re-transmitting the content of repeatedly accessed and/or processed URIs. The cache server 41 is preferably an HTTP cache server running HTTP cache server software such as the Squid proxy cache as is well known in the art, but alternatively any suitable cache server software may be used. The cache server 41 preferably facilitates communication between the call router 22 and the application server 26 and enables retrieval of a URI resource. The URI resource is preferably a telephony compatible media file, and is more preferably referenced by a persistent URI. A cached URI resource is preferably not an exact copy of a media file, but a media file that has been previously processed within the media layer to be telephony compatible. In the case where the original media resource was in telephony compatible format, then the cached version may be identical to the original version. The URI of a resource may additionally include embedded media parameters. The media parameters function to uniquely distinguish cached media. For example, a cached Text-To-Speech media file can be identified by an embedded cryptographic hash of the text. A HTTP request is preferably sent to the cache server 41. The HTTP request preferably includes HTTP request details including HTTP headers, POST, or query string parameters, but alternatively any suitable communication scheme may be used for communication. The cache server 41 preferably checks for a valid copy of the URI resource (a non-expired copy previously retrieved during a URI request or during any suitable time). If a valid copy is found within the cache server 41, the cache server 41 preferably responds to the call router 22 with the valid copy of the URI resource. If a valid copy is not found within the cache server 41, the cache server 41 preferably sends the HTTP request to the application server 26. The cache server may alternatively send the HTTP request to an intermediate server, such as the transcoding proxy server 43, Text-To-Speech web service 44, or any suitable server or service. The cache server 41 may additionally or alternatively use external servers 41' for storing media content. Media stored on external or third party servers 41' is preferably encrypted. When returning encrypted data the cache may decrypt the media file within the media layer prior to transmitting. In variation where encryption and decryption operations are performed, the media layer preferably includes an encryption/decryption server 46 to handle the encryption and/or decryption of a media file. To avoid additional processing and transmission time for the first initiated telephony session, the system preferably includes an application-testing program that primes the cache server 41 with the complete set of cacheable telephony responses, or a subset of responses such as large static media files, before a telephony session and/or the first telephony application use. This may alternatively, by programmatically implemented by the media layer API 50. Additionally, the HTTP response of the application server 26 and/or the transcoding proxy server 43 preferably includes cache-related directives. Preferably, the cache-related directives are included in the HTTP headers, and preferably indicate whether the response may be cached, and for how long a URI resource remains cached on the cache server 41. Such directives may alternatively be indicated in media layer API messages. When the URI resource reaches an expiration time, the cache server 26 preferably deletes or updates the URI resource. Alternatively, any suitable cache-related directive may be used, such as those defined in IETF or W3C Standards including W3C RFCs 2616, 2186, 2187. In one variation of the preferred embodiment, when the application server content changes on a daily basis (e.g. stock prices, weather conditions, scheduled appointments), the cache server 41 updates the complete set of URI resources at least one time per day, preferably during off-peak hours (e.g., updating schedules for the next day at 3 AM).

The transcoding proxy server 43 of the media layer 40 functions to convert audio files received from the application server 26 and optimize the audio files for telephony applications. The transcoding proxy server preferably acts as an intermediary between the cache server 41 and the application server 26. In one variation of the preferred embodiment, the cache server 41 sends the HTTP request to the transcoding proxy server 43, and the transcoding proxy server 43 preferably requests the URI resource from the application server 26. The transcoding proxy server 43 preferably receives the URI resource and decides if any CPU-intensive tasks are required before returning the content to the cache server 41. In one variation, the CPU-intensive task is preferably transcoding audio from one format to another format (e.g., a telephony compatible format). The CPU-intensive task may alternatively be using preconfigured MIME-types to transcode audio to another MIME-type. The MIME-type of the URI resource along with introspection of the media is preferably used as criterion for deciding if to transcode. The CPU-intensive task alternatively may use instructions in the HTTP request, preferably the HTTP header, to transcode audio into a specified format such as 11 Khz, 8 bit mono PCM audio. Configuration parameters, HTTP instructions, or any other suitable information may additionally be used to determine if transcoding is required or desirable. The transcoding proxy server 43 may alternatively convert video files to audio, perform signal processing on audio, or perform any suitable media translation tasks. After any mime-type conversion, the transcoding proxy server 43 preferably updates the mime-type in the response.

The audio files received from the application server 26 are preferably MP3 files, but may alternatively be WAV, AAC, RA, MP2, WMA, or any other suitable audio format or encoding. The transcoding proxy server 43 may also receive XML instructions and/or plain text information from the application server 26, which preferably passes the instructions and/or information through to the cache server 41 unmodified. The cache server 41 preferably connects to the transcoding proxy server 43 using an application layer protocol, such as the HTTP protocol. Preferably, the transcoding proxy server 43 connects directly to the application server 26 using an application layer protocol, such as the HTTP protocol. Alternatively, the transcoding proxy server 43 uses a secure protocol that functions to provide security during communication with the application server 26. The secure protocol is preferably HTTPS though any suitable protocol may be used. The use of a secure protocol is preferably indicated in the HTTP header of the HTTP request from the call router 22, and is passed through the cache server 41 to the transcoding proxy server 43. This preferably enables HTTP requests to be used in intranet connections (internal/controlled communication, such as between call router 22, cache server 41, and transcoding proxy server 43, where interim processing may be required) and HTTPS requests for Internet connections (external/uncontrolled communications). The use of a secure protocol further functions to allow an application developer or system administrator running the application server 26 to provide an additional level of security with respect to their web application. As another alternative, the transcoding proxy server 43 and cache server 242 stream URI resource responses as they are downloaded, transcoded, and/or cached, without waiting for the download, transcode, and/or cache operation to finish. This functions to allow large URI resources (such as large mp3 files) to begin playing before downloaded, transcoded, and/or cached entirely.

The Text-To-Speech web service 44 of the media layer 40 functions to convert textual input into audio speech. The Text-To-Speech web service 44 is preferably an independently running server, but may alternatively be located on the same device as the other media layer devices, or may alternatively be remotely accessible over the Internet. The Text-To-Speech web service 44 preferably receives the text to convert in an HTTP request from the call router 22 via the cache server 41. The HTTP request preferably includes a URI representing the desired conversion (text, voice type, speech speed, language, and/or any suitable setting) and the full text to be converted. The URI preferably encapsulates the full text to be converted. In another preferred variation, the URI may have a length limitation, and the URI preferably includes a fixed length cryptographic hash of the desired conversion including the full text. The full text is preferably included in the HTTP headers. The cryptographic hash functions as a unique persistent URI for each combination of text and conversion. The text is preferably the text that is to be converted into speech. The conversion information preferably includes voice type, speech speed, language, and/or any suitable parameters for the Text-To-Speech process. The cryptographic hash URI further functions to enable the cache server 41 to effectively cache the results of a Text-To-Speech conversion. In another variation, the cryptographic hash preferably encapsulates all conversion parameters, with their cleartext values provided in the HTTP headers of the request. The Text-To-Speech web service 44 generates the audio speech based on the conversion parameters from the call router 22, or more preferably from the web cache server 41 (with HTTP headers permitting caching). The cache server 41 preferably caches the audio for future reuse. In one variation, the audio resulting from the Text-To-Speech conversion is preferably streamed from the Text-To-Speech web service 44 back to the call router 22 through the cache server 41. Long audio files are preferably cached on the cache server 41 after being streamed the first time.

In one variation, the Text-To-Speech web service 44 preferably automates the selection and professional recording of frequently used words and phrases. Frequently used words and phrases are preferably defined to be words and phrases used more than a pre-specified frequency over a period of time (e.g. "Transferring your call" used one-hundred times per day). The frequently used words and phrases may be determined algorithmically (e.g., based on application history or system history) or alternatively may be specified by an application operator. Alternatively, high value words or phrases (e.g. phrases for marketing a brand) may be additionally or alternatively professionally recorded. The selected frequently used words and phrases are preferably transmitted to a remote site where they are professionally recorded by a voice actor in a studio. The transmission is preferably email, but may alternatively be an SMS message, a fax, a mailed document, or any other suitable transmission. The professional recording may be recorded word by word, phrase by phrase, with multiple intonations, or any other suitable recording methodology. The professional recording is preferably transmitted electronically to an application server 26, but may alternatively be transmitted to a Text-To-Speech conversion web service 44, a cache server 41, a transcoding proxy server 43, a call router 22 or any other suitable web server. The professional recordings are preferably transmitted in 8-bit PCM format, but may alternatively be transmitted in WAV, MP3, or any other suitable audio format. The return transmission of the professionally recorded audio files is preferably an HTTP post request, but may alternatively be an FTP transfer, an email, a mailed data storage device (e.g. CD ROM, memory card or Flash Disk) or any other suitable transmission.

The application server 26 functions to provide data processing logic for requests received from the call router 22. The application server 26 is preferably connected to the call router 22 via a network 24, more preferably via the Internet. The application server 26 is preferably a third party server operated outside of the system, but the system may alternatively include the application server 26. The URI 23 is preferably associated with an application server 26 or an application on an application server 26. The application server 26 preferably communicates with the call router 22 using an application layer protocol, more preferably using the HTTP protocol, or more secure HTTPS protocol. The application server 26 preferably receives HTTP requests from and sends HTTP responses to the call router 22. The application server 26 preferably runs on a standard stack of programming languages, hosting providers, operating systems and databases to handle HTTP requests, as if the caller were a website visitor in a web browser. The application server 26 also preferably verifies the digital signatures of the call data received in the requests using the secret key to compute a cryptographic hash from the received information and the hash received. If the computed hash and the received hash do not match, or no hash is received with the request, then the application server 26 preferably determines the request is fraudulent, and the request is preferably discarded. If the computed hash and received hash match, the application server 26 preferably determines that the request is authentic and proceeds further with the processing of the request. The application server may alternatively choose to ignore the hash if security is not important. The application server preferably uses call state data communicated by the call router request to determine the next call router instructions, without requiring call state stored on the application server. The application server may alternatively use call state data sent by the call router, such as the caller ID of the caller or the unique ID of the call, to reference additional or external state data, such as rows in a database or session data stored on the application server.

The application server 26 preferably responds to HTTP requests received from the call router 22 by generating telephony instructions 27 for the call router 22. The application server preferably replies to the call router in XML, however, any suitable machine-readable message format may be used, including HTML, key/value pair text, delimited text or binary encoding. The XML preferably includes the telephony instructions 27 for the call router 22 such as connecting to another number, playing a recorded greeting, reading text, and/or requesting DTMF digit entry from the caller. The telephony instruction 27 may alternatively be related to SMS messaging, Multimedia Messaging Service (MMS) messaging, email, or any suitable messaging task. The telephony instruction 27 may additionally be used to send an outgoing SMS message, arrange a phone call from a specific phone number, arranging for a callback, setting up a conference call (connecting multiple numbers), sending an email, interfacing with a calendar or scheduling system, purchasing goods, or services, or any other suitable instruction. The XML instructions are preferably a set of commands to be executed in order, one at a time (i.e., sequentially). An example XML response is shown in FIGS. 5A and 5B. In single telephony session (e.g. one initiated by a PSTN-device or an SMS device) a response from an application server can initiate an outgoing telephony call and/or a SMS message. That is, a single XML response preferably provides the ability to interact with both the SMS network and the voice telephony network (PSTN, SIP/VoIP, etc) sequentially or simultaneously. Media files may alternatively be sent from the application server 26. The application server 26 may respond to a request with an audio file, transmitting the audio file to the transcoding proxy server 242 for conversion into 8-bit PCM at 8 kHz bandwidth suitable for telephony before sending the converted audio file, with its new mime-type header. The media file is then preferably sent to the cache server 241 for caching and forwarded to the call router 22. Preferably, the cache server 241 caches the most frequently used or all of the responses of the application server 26 to reduce the number of customized responses. This enables a more efficient use of both the computation and the transmission bandwidth to the applications server 26, effectively allowing more concurrent users to be served by a single application server. In one variation, the application server 26 may prime (or push) updated sound files to the media layer for caching. This priming is preferably done at off peak hours after new content is being generated or for periodic changes of an application (e.g. a new weather report). In addition, audio or video files sent to the call router 22 can be converted to text by an automatic speech-to-text engine, human or other technique, and sent back in text form as an SMS message or an attachment to an MMS. In one variation, an application running on a server may be a simple static XML page and static sound files, deployed on basic web servers where no development or scripting environment is available. This variation preferably uses URI Templates (a current IETF proposal for HTML5), which essentially includes URLs with placeholders for variable data, like this: http://www.twilio.com/audio/{Digit}.mp3 where the call router 22 would substitute the digits pressed for the {Digit} placeholder in the URI Template, GET the file at the resulting URI, and play the static sound file in response. This allows an entire application to be authored offline in a What-You-See-Is-What-You-Get (WYSIWYG) html editor. For example, if the server response specifies the URI Template: http://demo.twilio.com/myapp/{Digits}.mp3, and the caller presses digits 1234, the call router 22 would GET the static mp3 file located at: http://demo.twilio.com/myapp/1234.mp3 and play it to the caller. The variables used for substitution in the URI Templates preferably correspond to the names of variables defined for state submission in HTTP GET, POST and/or header requests from the call router. From the previous example, {Digits} would be associated with a parameter named "Digits" that is preferably generated as a result of a "gather" telephony instruction (collection of DTMF digits). In the preferred embodiment for the second configuration, the call is initiated by the application server 26 (through the call router 22), and the second configuration 30 is substantially similar to the first configuration 20, such that the call routing is preferably handled identically to an incoming call, namely via URI requests from call router 22 to the server 26 upon call state changes. The application server preferably additionally is able to make calls to the Call Router API as described above.

As a person skilled in the art will recognize from the previous detailed description and from the figures and claims, modifications and changes can be made to the preferred embodiments of the invention without departing from the scope of this invention defined in the following claims. It is possible, and indeed hoped, that additional applications will be designed and built upon this technology platform (the preferred method and/or system of the invention) that would not otherwise be possible using conventional telephony platforms.

We claim:

1. A method of caching media for use in a telephony applications comprising:
    at a call router, generating a media request initiated by a telephony application session;
    sending the media request to a media layer using HTTP communication protocol wherein the media request includes text to be converted to speech in a HTTP message;
    wherein the media layer performs the following steps:
        checking in a cache for a telephony compatible media resource specified by the media request and identified by a persistent Universal Resource Identifier (URI), wherein the persistent URI has embedded media parameters that uniquely identify contents of the media resource;
        if a telephony compatible media resource is identified in the cache by the persistent URI, forwarding the cached media resource to the call router;
        if a telephony compatible media resource is not identified in the cache by the persistent URI, processing the media request at a media processing server to generate a telephony compatible media resource; storing the generated media in the cache as a telephony compatible media resource specified by the persistent URI; and forwarding the generated media to the call router;
    wherein processing the media request at a media processing server includes forwarding the media request to a Text-To-Speech server;
    wherein storing the generated media in the cache includes caching speech audio generated by the Text-To-Speech server according to cache directives; and
    wherein forwarding the generated media to the call router includes returning the speech audio to the call router.

2. The method of claim 1, further comprising automatically allocating cache resources and media processing server resources of the media layer.

3. The method of claim 1, wherein the media request is sent through a media layer application programming interface (API) from the call router to the media layer.

4. The method of claim 1, further comprising generating a second media request through a media layer application programming interface (API) prior to sending the media request generated by the call router; and sending the media request to the media layer using HTTP; wherein the media layer performs the following steps prior to the telephony session initiating the media resource: checking in the cache for a telephony compatible media resource specified by the second media request and identified by a persistent Universal Resource Identifier (URI); if a telephony compatible media resource is not identified in the cache by the persistent URI of the second media request, processing the second media request within a media processing server to generate a telephony compatible media resource; and storing the generated media of the second media request in the cache as a telephony compatible media resource specified by a persistent address.

5. The method of claim 1, where the step of processing the media request includes encrypting the telephony compatible media resource, and wherein the step of storing the generated media in the cache includes storing the encrypted media resource in a third party server.

6. The method of claim 1, further comprising checking for a directive indicating to not cache the media and following the directive.

7. The method of claim 1, wherein the step of processing the media request includes retrieving media from an external server and converting the retrieved media to a telephony compatible media format with a transcoding proxy server of the media processing server.

8. The method of claim 7, wherein HTTPS is used for network communication between the media layer and the external server and HTTP is used for network communication within the media layer.

9. The method of claim 1, wherein the step of processing media includes converting Text-To-Speech according to parameters of the HTTP media request directed at the persistent URI.

10. The method of claim 9, wherein the media parameters include voice parameters for the Text-To-Speech conversion.

11. The method of claim 1, wherein forwarding the cached media resource and forwarding the generated media include streaming the media from an external server through the media processor, through the cache, and to the call router.

12. The method of claim 11, further comprising the call router writing the media resource to disk prior to using the resource.

13. The method of claim 1, further comprising forwarding the speech audio to a transcoding proxy server and converting the speech audio to a telephony compatible media format prior to caching the speech audio.

14. A method of caching media for use in a telephony applications comprising:
at a call router, generating a media request initiated by a telephony application session;
sending the media request to a media layer using HTTP;
wherein the media layer performs the following steps:
checking in a cache for a telephony compatible media resource specified by the media request and identified by a persistent Universal Resource Identifier (URI), wherein the persistent URI has embedded media parameters that uniquely identify contents of the media resource;
if a telephony compatible media resource is identified in the cache by the persistent URI, forwarding the cached media resource to the call router;
if a telephony compatible media resource is not identified in the cache by the persistent URI, processing the media request at a media processing server to generate a telephony compatible media resource; storing the generated media in the cache as a telephony compatible media resource specified by the persistent URI; and forwarding the generated media to the call router;
wherein processing the media request at a media processing server includes retrieving the media from an external server, wherein HTTPS is used for network communication between the media layer and the external server and HTTP is used for network communication within the media layer and between the call router and the media layer;
if the media requires conversion, converting the media to a telephony compatible media format with a transcoding proxy server; and
wherein storing the generated media in the cache includes caching the telephony compatible media according to cache directives.

* * * * *